United States Patent
Shimizu

(10) Patent No.: US 8,106,965 B2
(45) Date of Patent: Jan. 31, 2012

(54) IMAGE CAPTURING DEVICE WHICH CORRECTS A TARGET LUMINANCE, BASED ON WHICH AN EXPOSURE CONDITION IS DETERMINED

(75) Inventor: Saori Shimizu, Koganei (JP)

(73) Assignee: Olumpus Corporation, Tokyo (JP)

( * ) Notice: Subject to any disclaimer, the term of this patent is extended or adjusted under 35 U.S.C. 154(b) by 537 days.

(21) Appl. No.: 12/211,959

(22) Filed: Sep. 17, 2008

(65) Prior Publication Data

US 2009/0073287 A1    Mar. 19, 2009

(30) Foreign Application Priority Data

Sep. 18, 2007 (JP) ................................. 2007-240890

(51) Int. Cl.
*G06K 9/00* (2006.01)
*H04N 9/68* (2006.01)
(52) U.S. Cl. .................... 348/234; 348/235; 382/169
(58) Field of Classification Search ............... 348/364, 348/365, 222.1; 382/169
See application file for complete search history.

(56) References Cited

U.S. PATENT DOCUMENTS

| | | | | |
|---|---|---|---|---|
| 5,974,190 | A * | 10/1999 | Maeda et al. ................. | 382/255 |
| 6,462,835 | B1 * | 10/2002 | Loushin et al. ............... | 358/1.9 |
| 6,463,172 | B1 * | 10/2002 | Yoshimura .................... | 382/162 |
| 6,583,820 | B1 * | 6/2003 | Hung ............................. | 348/362 |
| 6,850,214 | B2 * | 2/2005 | Nishitani et al. .............. | 345/87 |
| 7,057,650 | B1 * | 6/2006 | Sakamoto ..................... | 348/239 |
| 7,486,836 | B2 * | 2/2009 | Kato .............................. | 382/274 |
| 2003/0012414 | A1 * | 1/2003 | Luo ............................... | 382/118 |
| 2003/0099407 | A1 * | 5/2003 | Matsushima ................. | 382/274 |
| 2004/0021779 | A1 * | 2/2004 | Yano ............................. | 348/222.1 |
| 2004/0207734 | A1 * | 10/2004 | Horiuchi ....................... | 348/229.1 |
| 2006/0114527 | A1 * | 6/2006 | Tsukioka et al. ............. | 358/519 |
| 2007/0177050 | A1 | 8/2007 | Xiao et al. | |

FOREIGN PATENT DOCUMENTS

JP    2000-184272 A    6/2000

(Continued)

OTHER PUBLICATIONS

P. Viola et al; Rapid Object Detection Using a Boosted Cascade of Simple Features; Accepted Conference on Computer Vision and Pattern Recognition 2001.

(Continued)

*Primary Examiner* — Sinh Tran
*Assistant Examiner* — Selam Gebriel
(74) *Attorney, Agent, or Firm* — Holtz, Holtz, Goodman & Chick, PC

(57) ABSTRACT

An image having the image quality desired by a photographer is provided by minimizing overexposure or underexposure, making the dynamic range wide, and specifying an optimum brightness level for a main subject. An image capturing device includes a subject detecting unit which detects a main subject in an image obtained before actual photographing; a subject luminance information acquiring unit which obtains luminance information; a luminance distribution calculating unit which calculates a luminance distribution of each of multiple areas; a target luminance calculating unit which determines a target luminance; a target luminance correcting unit which corrects the target luminance; and an exposure condition determining unit which determines an exposure condition for the actual photographing, in which the target luminance correcting unit includes a criterial range determining unit which determines the criterial range; and a correction amount determining unit which determines a correction amount by using the difference between the target luminance and the luminance of the main subject.

12 Claims, 31 Drawing Sheets

FOREIGN PATENT DOCUMENTS

| | | |
|---|---|---|
| JP | 2002-300468 A | 10/2002 |
| JP | 3478769 B2 | 10/2003 |
| JP | 2004-229054 A | 8/2004 |
| JP | 2006-157599 A | 6/2006 |
| JP | 2006-227995 A | 8/2006 |
| JP | 2007-201979 A | 8/2007 |

OTHER PUBLICATIONS

Japanese Office Action dated Oct. 6, 2009, and partial English translation thereof, issued in counterpart Japanese Application No. 2007-240890.

* cited by examiner

FIG. 13

| CONDITION | | CORRECTION FACTOR | | CORRECTION UPPER AND LOWER VALUES | |
|---|---|---|---|---|---|
| FACE DETECTION RESULT | DISTANCE MEASUREMENT RESULT | k_low | k_high | bv_hos_max | bv_hos_min |
| OBTAINED | — | 0.85 × (face_l)/100 | 0.9 × (face_l)/100 | 1.5 | −2.0 |
| NOT OBTAINED | OBTAINED | 0.6 | 0.7 | 1.0 | −0.75 |
| NOT OBTAINED | NOT OBTAINED | 0.4 | 0.5 | 0.5 | −0.5 |

GRADATION CONVERSION
CHARACTERISTIC CURVE

| γ SELECTION CONDITION | γ |
|---|---|
| bv_o-bv_near ≧ th2 | γ2 |
| th1 ≦ bv_o-bv_near < th2 | γ3 |
| bv_o-bv_near < th1 | γ4 |

| ISO SENSITIVITY | sv | o_th_low | o_th_high |
|---|---|---|---|
| 100 | 5 | -2 | 1 |
| 200 | 6 | -1.9 | 1 |
| 400 | 7 | -1.8 | 1 |
| 800 | 8 | -1.6 | 1 |
| 1600 | 9 | -1.4 | 1 |
| 3200 | 10 | -1.2 | 1 |
| 6400 | 11 | -1.0 | 1 |

| γ SELECTION CONDITION | γ |
|---|---|
| light_o ≧ th2' | γ2 |
| th1' ≦ light_o < th2' | γ3 |
| light_o < th1' | γ4 |

FIG. 30

| COMPOSITING RATIO SELECTION CONDITION | COMPOSITING RATIO (%) |
|---|---|
| light_o ≧ th2' | 30 |
| th1' ≦ light_o < th2' | 45 |
| light_o < th1' | 50 |

IMAGE CAPTURING DEVICE WHICH CORRECTS A TARGET LUMINANCE, BASED ON WHICH AN EXPOSURE CONDITION IS DETERMINED

BACKGROUND OF THE INVENTION

1. Field of the Invention

The present invention relates to an image capturing device such as a digital camera.

This application is based on Japanese Patent Application No. 2007-240890, the content of which is incorporated herein by reference.

2. Description of Related Art

Image capturing devices have been conventionally known which measure the luminance of a main subject and adjust the exposure level for the main subject.

Image capturing devices have also been known which use subject luminance distribution information to perform exposure adjustment and a gradation conversion process in order to prevent overexposure or underexposure from occurring in the entire screen and have a wide dynamic range (see, for example, Japanese Unexamined Patent Application, Publication No. 2000-184272, Japanese Unexamined Patent Application, Publication No. 2004-229054, and Publication of Japanese Patent No. 3478769).

However, in the image capturing devices which measure the luminance of the main subject and adjust the exposure level for the main subject, overexposure or underexposure may occur in portions other than the main subject in a scene having a large difference in luminance, producing an unnatural image when viewing the whole screen.

Further, in the image capturing devices which perform the exposure adjustment and the gradation conversion process, when the subject is a person, the brightness of the subject may be excessive or insufficient, thus making it impossible to see the facial expression of the person.

Therefore, in the conventional image capturing devices, images desired by the photographer may not be obtained in some cases.

BRIEF SUMMARY OF THE INVENTION

The present invention has been made to solve the above-described problems, and an object of the present invention is to provide an image capturing device capable of providing an image desired by the photographer by minimizing overexposure or underexposure, making the dynamic range wide, and specifying an optimum brightness level for the main subject.

In order to solve the above-described problems, the present invention employs the following solutions.

According to a first aspect, the present invention provides an image capturing device including a subject detecting unit which detects a main subject in an image obtained before actual photographing, from an image signal of the image; a subject luminance information acquiring unit which obtains luminance information on the main subject from the image signal; a luminance distribution calculating unit which calculates a luminance distribution of each of multiple areas in the image; a target luminance calculating unit which determines a target luminance, related to exposure, based on the luminance distribution; a target luminance correcting unit which corrects the target luminance when the difference between the target luminance and the luminance of the main subject does not fall in a criterial range; and an exposure condition determining unit which determines an exposure condition for the actual photographing based on the target luminance or a corrected target luminance when the target luminance correcting unit has corrected the target luminance, in which the target luminance correcting unit includes a criterial range determining unit which determines the criterial range; and a correction amount determining unit which determines a correction amount by using the difference between the target luminance and the luminance of the main subject.

According to a second aspect, the present invention provides an image capturing device including a luminance distribution calculating unit which calculates a luminance distribution of each of multiple division areas in an image signal obtained before actual photographing; a target luminance calculating unit which determines a target luminance, related to exposure, based on the luminance distribution; a subject detecting unit which detects a main subject in the image signal; a subject luminance information acquiring unit which obtains luminance information on the main subject; an image processing unit which applies a local gradation conversion process to the image signal; a luminance evaluation value calculating unit which calculates a luminance evaluation value of the main subject by using an image signal obtained through the local gradation conversion process; a target luminance correcting unit which corrects, when the difference between the luminance evaluation value and the target luminance does not fall in a predetermined range, the target luminance such that the difference falls in the predetermined range; and an exposure condition determining unit which determines an exposure condition for actual photographing based on the corrected target luminance.

According to the present invention, it is possible to obtain an image desired by the photographer in which overexposure or underexposure is minimized and the brightness of the main subject is made optimum.

BRIEF DESCRIPTION OF THE SEVERAL VIEWS OF THE DRAWINGS

FIG. 13 is a diagram showing an example of a correction factor table.

FIG. 30 is a table showing the relationship between a compositing ratio and a subject-area average luminance value used in the luminance estimation process.

DETAILED DESCRIPTION OF THE INVENTION

Hereinafter, image capturing devices according to embodiments of the present invention will be described with reference to the drawings.

First Embodiment

Figure 1:
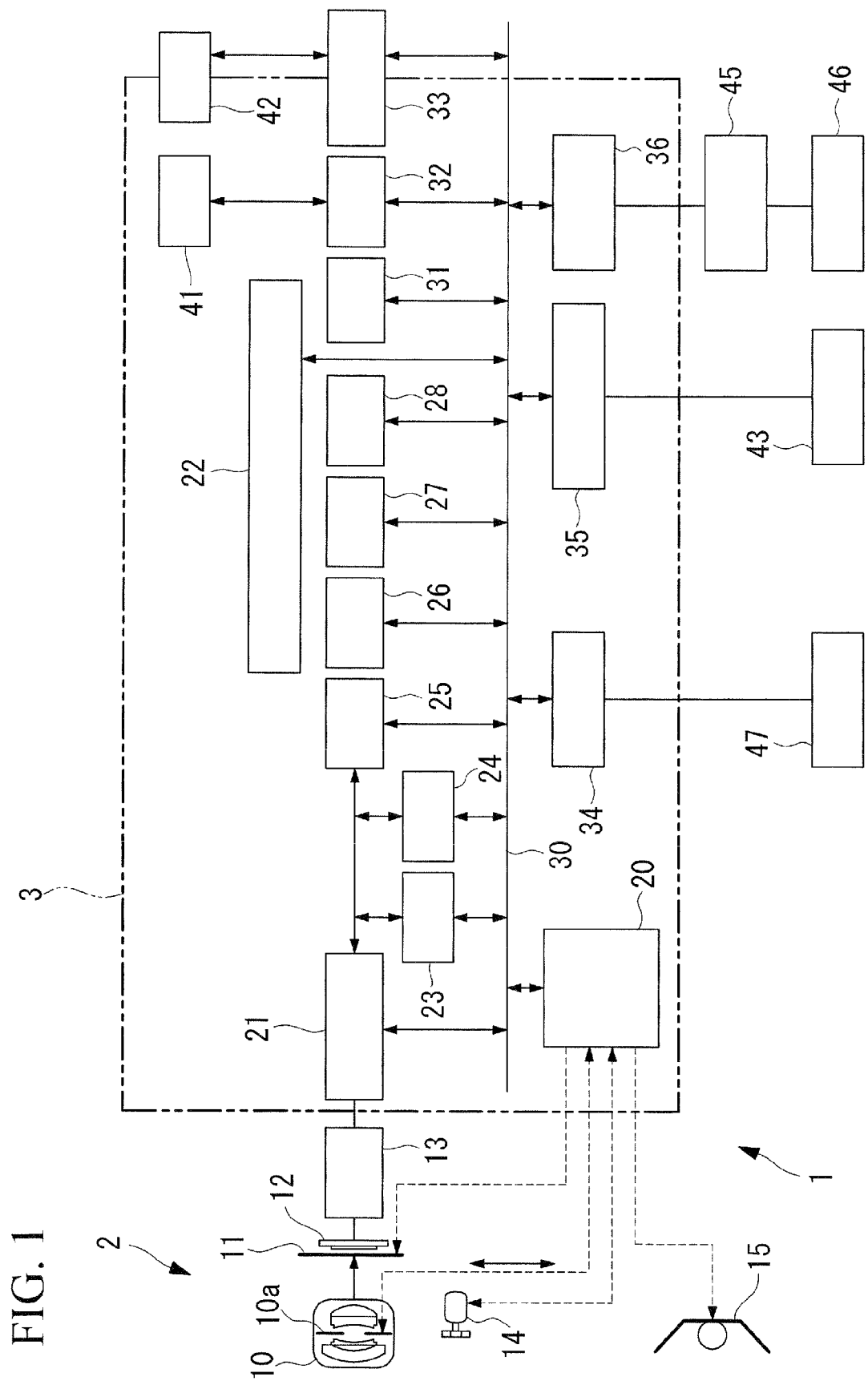
FIG. 1 is a diagram showing an overall general configuration of an image capturing device according to a first embodiment of the present invention.

FIG. 1 is a block diagram showing a general configuration of an image capturing device 1 according to a first embodiment of the present invention. The image capturing device 1 of this embodiment is a digital camera, for example, and includes an image capturing unit 2 and an image processing device 3. The image capturing unit 2 includes a lens 10, a shutter 11, a CCD 12, a CCD control unit 13, a lens driving unit 14, and a stroboscope 15.

The lens 10 includes a photographic lens for focus adjustment and focal distance adjustment and an aperture stop 10a for aperture adjustment. The aperture stop 10a adjusts the depth of field and the brightness of light incident on the imaging area, according to a control instruction sent from a photography control unit 20. In inexpensive image capturing devices which do not require depth of field adjustment, however, the aperture stop 10a can be replaced, for example, with an ND filter used to adjust the amount of light, for the purpose of brightness adjustment.

The lens 10 is driven when the lens driving unit 14 is operated under the control of the photography control unit 20, to be described later. Then, focusing, zooming, and the like are performed based on a control instruction sent from the photography control unit 20. The stroboscope 15 can emit light to a subject under the control of the photography control unit 20.

The shutter 11, for controlling exposure time, is provided behind the lens 10. The shutter 11 is driven and controlled by the photography control unit 20.

The shutter 11 is always opened at the time of through-the-lens image photographing. At this time, the exposure level for the CCD 12 is controlled by using an electronic shutter function included in the CCD 12. Further, at the time of so-called still-image photographing (hereinafter referred to as "still photography"), the exposure level for the CCD 12 is controlled by the shutter 11.

The CCD 12, serving as a two-dimensional image pickup device, is provided behind the shutter 11, and photoelectrically converts a subject image formed by the lens 10 into an electrical signal. Note that the COD is used as an image pickup device in this embodiment, but the image pickup device is not limited thereto. A two-dimensional image pickup device such as a complementary metal oxide semiconductor (CMOS) device can also be used.

The CCD control unit 13 is connected to a CCD interface 21. The CCD control unit 13 receives a control signal from a sequence controller 22 (hereinafter referred to as "body CPU"), to be described later, via the CCD interface 21, controls power on and off of the CCD 12 according to the control signal, adjusts the timing of image capturing, and amplifies (adjust the gain of) the electric signal obtained through the photoelectric conversion.

An analog image signal obtained by the CCD 12 is converted into a digital signal by the CCD interface 21, and the digital signal is input to the image processing device 3.

The image processing device 3 is an ASIC, for example, and includes the photography control unit 20, the CCD interface 21, the body CPU 22, a luminance calculation unit 23, an AF calculation unit 24, a first image processing unit 25, a face detection unit 26, a second image processing unit 27, a third image processing unit 28, and other components. These units are connected to one another via a data bus 30 in the image processing device 3.

The body CPU 22 controls each unit included in the image capturing device 1.

The luminance calculation unit 23 calculates the average of the image signal in each predetermined division area and converts the averages into a luminance signal to obtain luminance distribution information of the subject.

The AF calculation unit 24 calculates contrast information of the image signal in each of predetermined division areas and drives the lens 10 such that the contrast of a predetermined division area becomes maximum, in synchronization with the control of the lens driving unit 14, thereby focusing on the subject.

The first image processing unit 25, the second image processing unit 27, and the third image processing unit 28 apply various types of image processing, such as OB subtraction, color correction, gradation conversion, monochrome/color mode processing, and through-the-lens image processing, to the image signal obtained by the image capturing unit 2.

The face detection unit 26 generates an image having an appropriate size for face detection from the image signal, and uses a known technology such as that disclosed in Japanese Unexamined Patent Application, Publication No. 2006-2277995 to extract a face candidate area by searching a processing target image for parts having features similar to those of face parts, and to determine whether the face candidate area indicates a face by using various types of information of the face candidate area, thereby detecting the position and the size of a face area.

A more specific face detection method is the Viola-Jones face detection method disclosed in "Rapid object detection using a boosted cascade of simple features," P. Viola and M. Jones, Proc. of CVPR, 2001. In the Viola-Jones face detection method, a face is detected by comparing rectangle filters which are appropriate for face detection and are selected through Adaboost learning, with a face detection target image. The face detection process is performed at a higher speed by arranging the rectangle filters in a cascade manner. Further, the comparison results obtained with the rectangle filters are accumulated and normalized in the face detection process and used as an evaluation value. When a face is detected in the face detection process, the evaluation value is output together with the face detection result, as an index indicating the reliability of the detected face. In this embodiment, this index is called face detection reliability and is used as an index indicating the reliability of a detected face, in sequences using the face detection result.

In addition to the components described above, a compression unit 31, a synchronous dynamic random access memory (SDRAM) control unit 32, a flash memory control unit 33, an operation detection unit 34, a recording medium control unit 35, and a video signal output unit 36 are connected to the data bus 30.

The compression unit 31 is a block for compressing image data stored in an SDRAM 41, to be described later, in a JPEG format. Note that the image compression method is not limited to JPEG; another compression method can be used. The flash memory control unit 33 is connected to a flash memory 42. The flash memory 42 stores an image processing program for controlling each process of the image capturing device 1. The body CPU 22 controls each unit according to the program stored in the flash memory 42. Note that the flash memory 42 is an electrically-rewritable non-volatile memory. The SDRAM 41 is connected to the data bus 30 via the SDRAM control unit 32. The SDRAM 41 is a memory used to temporarily store image information to which image processing has been applied in the first image processing unit 25 and the like or image information which has been compressed in the compression unit 31.

The photography control unit 20 is connected to each unit, such as the body CPU 22, via the data bus 30. The recording medium control unit 35 is connected to a recording medium 43 and controls recording of image data into the recording medium 43. The recording medium 43 is configured by a rewritable recording medium such as an xD picture card (registered trademark), a compact flash (registered trademark), an SD memory card (registered trademark), a memory stick (registered trademark), or a hard disk drive (HD), and can be detached from the image capturing device 1.

The video signal output unit 36 is connected to a display monitor 46 via a display monitor control unit 45. The video signal output unit 36 is a circuit to convert image data stored in the SDRAM 41 or in the recording medium 43 into a video signal to be displayed on the display monitor 46. The display monitor 46 is a liquid crystal display device located on the rear surface of the image capturing device 1, for example. The location of the display monitor 46 is not limited to the rear surface. The display monitor 46 may be located at any position as long as the photographer can view the display monitor 46. Further, the display monitor 46 is not limited to a liquid crystal display device; it may be another type of display device.

An operation unit 47 includes a switch for detecting the shutter release indicating a photographing instruction for the image capturing device 1, a mode dial, a power switch, a control dial, a playback button, a menu button, a directional pad, and an OK button. The operation unit 47 is connected to the data bus 30 via the operation detection unit 34.

In the image capturing device 1, having the above-described configuration, when a user turns on a power switch (not shown), a display sequence to be described below is executed by the body CPU 22, and each unit is operated under the control of the body CPU 22. Hereinafter, an operation flow of the display sequence will be described with reference to FIG. 2A and FIG. 2B.

[Display Sequence]

Figure 2A:
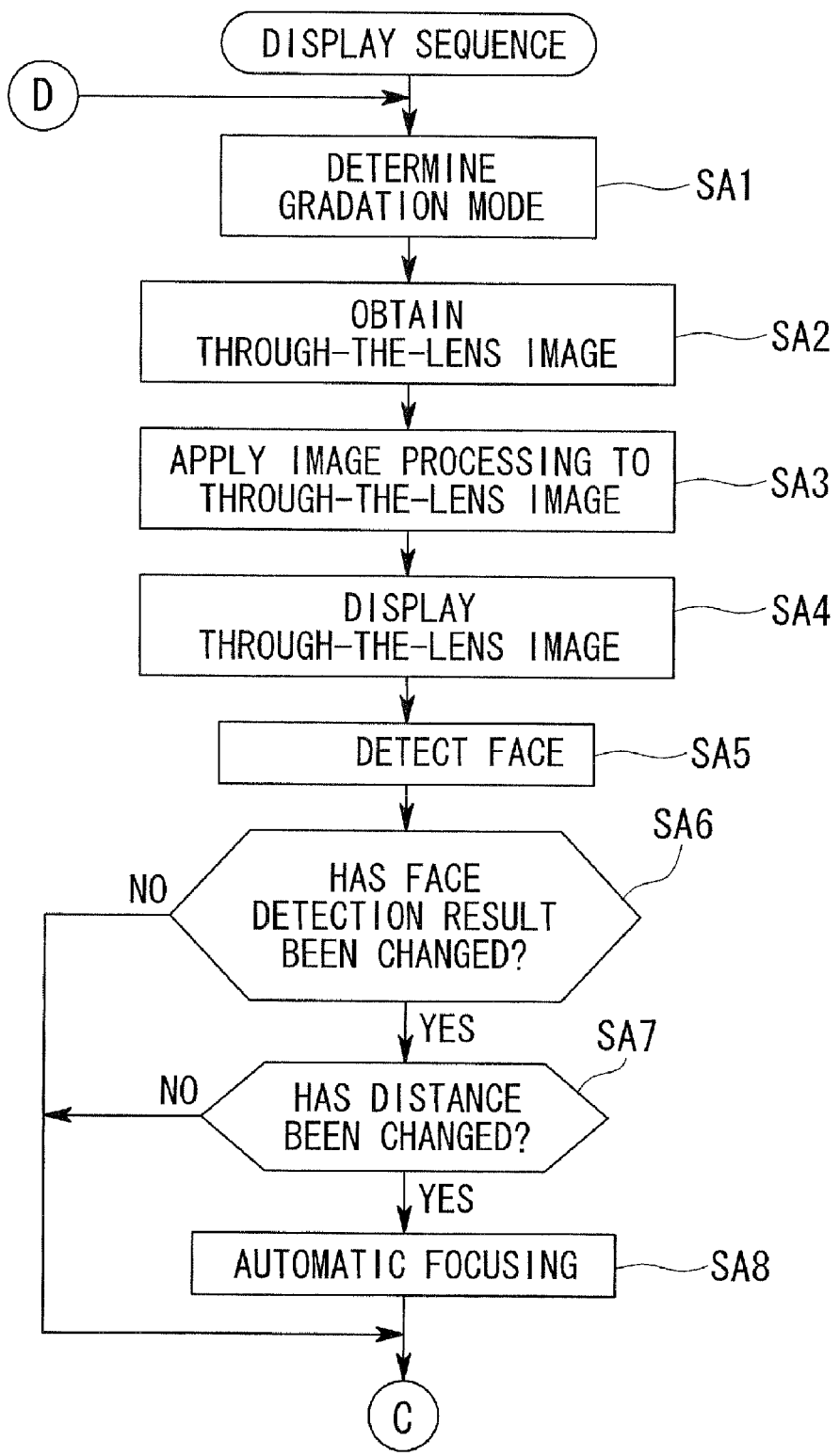
FIG. 2A is a diagram showing a display sequence.
Figure 2B:
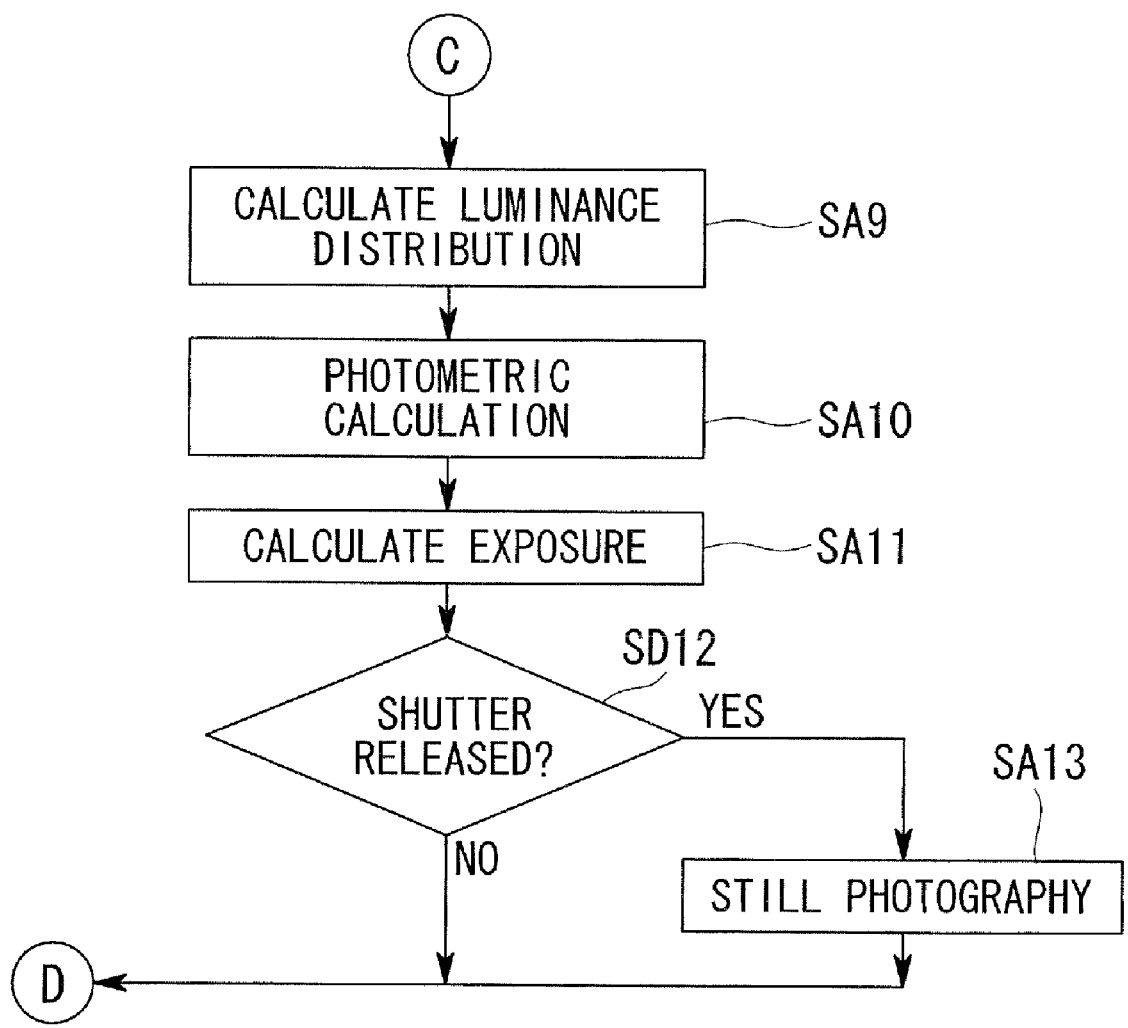
FIG. 2B is a diagram showing a display sequence.

When the user turns on the power, a gradation mode set by the user is determined (Step SA1 of FIG. 2A). In this embodiment, an automatic mode, an off mode, or a manual mode can be selected as the gradation mode.

In the automatic mode (first setting mode), gradation conversion suitable for a processing target image is automatically performed corresponding to characteristics of the image signal to be processed, in which, for example, an appropriate gradation conversion characteristic curve is selected for each position in the image, and the selected gradation conversion characteristic curve is used to perform gradation conversion. In the off mode (second setting mode), a predetermined gradation conversion characteristic curve is used on the whole screen to uniformly apply gradation conversion to the image signal. In the manual mode, the user can use the operation unit 47 to further fine-adjust the image signal obtained in the automatic mode.

Next, the image capturing unit 2 acquires a through-the-lens image to obtain the image signal (Step SA2) The image signal is converted into a digital signal by the COD interface 21, and the converted image signal (hereinafter referred to as "through-the-lens image signal") is input to the image processing device 3.

Next, the first image processing unit 25, the second image processing unit 27, and the third image processing unit 28 apply a color conversion process, an emphasis process, a gradation conversion process, a compression process, a resize process, and the like to the through-the-lens image signal (Step SA3). The through-the-lens image signal to which those processes have been applied is displayed on the display monitor 46 (Step SA4). Note that when a local gradation conversion process, to be described later, is applied to the through-the-lens image signal, an image close to an image obtained through still photography can be obtained.

Then, the face detection unit 26 converts the through-the-lens image signal into an image suitable for face detection, and performs face-feature matching and comparison for each predetermined area to detect the position and the size of a face (Step SA5). As a result, when a face is detected, the detection result is displayed on the display monitor 46.

Images suitable for face detection are stored during the above-mentioned various processes, and corresponding through-the-lens image signals are used for face detection.

Next, it is judged whether the face detection result is different from the preceding detection result (Step SA6). When the face detection result is different, which means, for example, that a face was detected in the preceding through-the-lens image signal but is not detected in the current through-the-lens image signal, that a face was not detected in the preceding through-the-lens image signal but is detected in the current through-the-lens image signal, or that the position or the size of the face has been changed, the operation flow advances to Step SA7.

In Step SA7, it is judged whether the distance to the subject is different from that in the preceding through-the-lens image signal. When the difference in contrast between an in-focus area in the through-the-lens image signal previously obtained through automatic focusing and an in-focus area in the current through-the-lens image signal is calculated and the difference is equal to or larger than a predetermined value, for example, it is judged that the distance to the subject has been changed. When the distance to the subject has been changed, the operation flow advances to Step SA8.

In Step SA8, automatic focusing is performed. Specifically, photographing and lens driving are repeated multiple times for the automatic focusing, the contrast in each of multiple areas (for example, obtained by 10 vertical divisions and 15 horizontal divisions) is calculated in each signal obtained through the photographing, and the lens 10 is driven to the position having the largest contrast value, thereby focusing on the subject.

Among the multiple division areas, the area whose contrast is to be emphasized in the lens driving is determined by a known algorithm. For example, in this embodiment, by using the face detection result obtained immediately before, when a face was detected, an area close to the face is emphasized based on the position information and the size information of the face, and when a face was not detected, the closest area is emphasized. Then, after the lens driving, the current photographing distance and focal distance and the subject distance in each area are calculated based on the contrast information and the lens position at each photographing and the lens position information at the end of the last lens driving. The photographing distance, the focal distance, and the subject distance are stored in a predetermined memory as subject distance distribution information, and the emphasized area and the contrast value in the emphasized area are also stored in the memory. Then, the operation flow advances to Step SA9.

On the other hand, when it is judged in Step SA6 that the face detection result is not different from the preceding detection result, or when it is judged in Step SA7 that the distance to the subject has not been changed, the operation flow advances to Step SA9.

In Step SA9, the luminance distribution of the subject is calculated using the through-the-lens image signal, and the luminance of a subject area and the luminance of a subject surrounding area are calculated using the above-mentioned face detection result. In Steps SA10 and SA11, the shutter speed, the aperture, and the ISO sensitivity for the through-the-lens image are determined based on the luminance distribution information of the subject, obtained in Step SA9, and their APESX values (av, tv, and sv) are stored in the memory and reflected in the next through-the-lens image exposure. Note that, images suitable for face luminance distribution calculation are stored during the above-mentioned various processes and corresponding through-the-lens image signals are used for face luminance distribution calculation.

In Step SA12, it is judged in the operation detection unit 34 whether the shutter release button has been pressed by the photographer. When the shutter release button has been pressed, the operation flow advances to Step SA13 to perform still photography.

Then, when the still photography is finished, or when the shutter release button has not been pressed in Step SA12, the operation flow returns to Step SA1 to repeat the above-described processes until the user turns off the power.

Note that, in the display sequence, when a long time is required for the processes of Step SA4 and the subsequent steps due to the system configuration or the like, the processes of Steps SA1 to SA3 may be performed in parallel with the other processes.

[Still Photography]

Figure 3A:
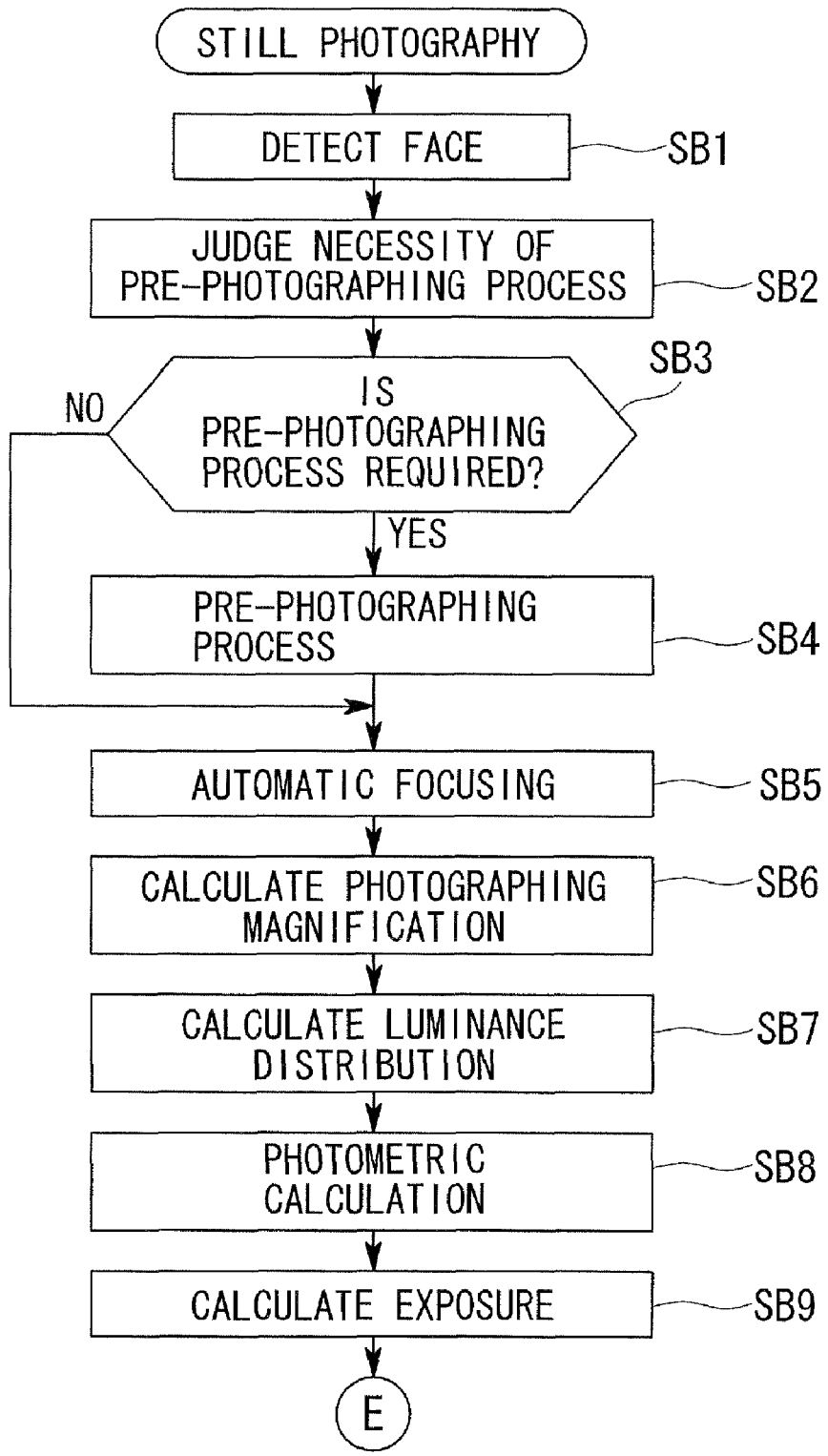
FIG. 3A is a diagram showing a still photography sequence.
Figure 3B:
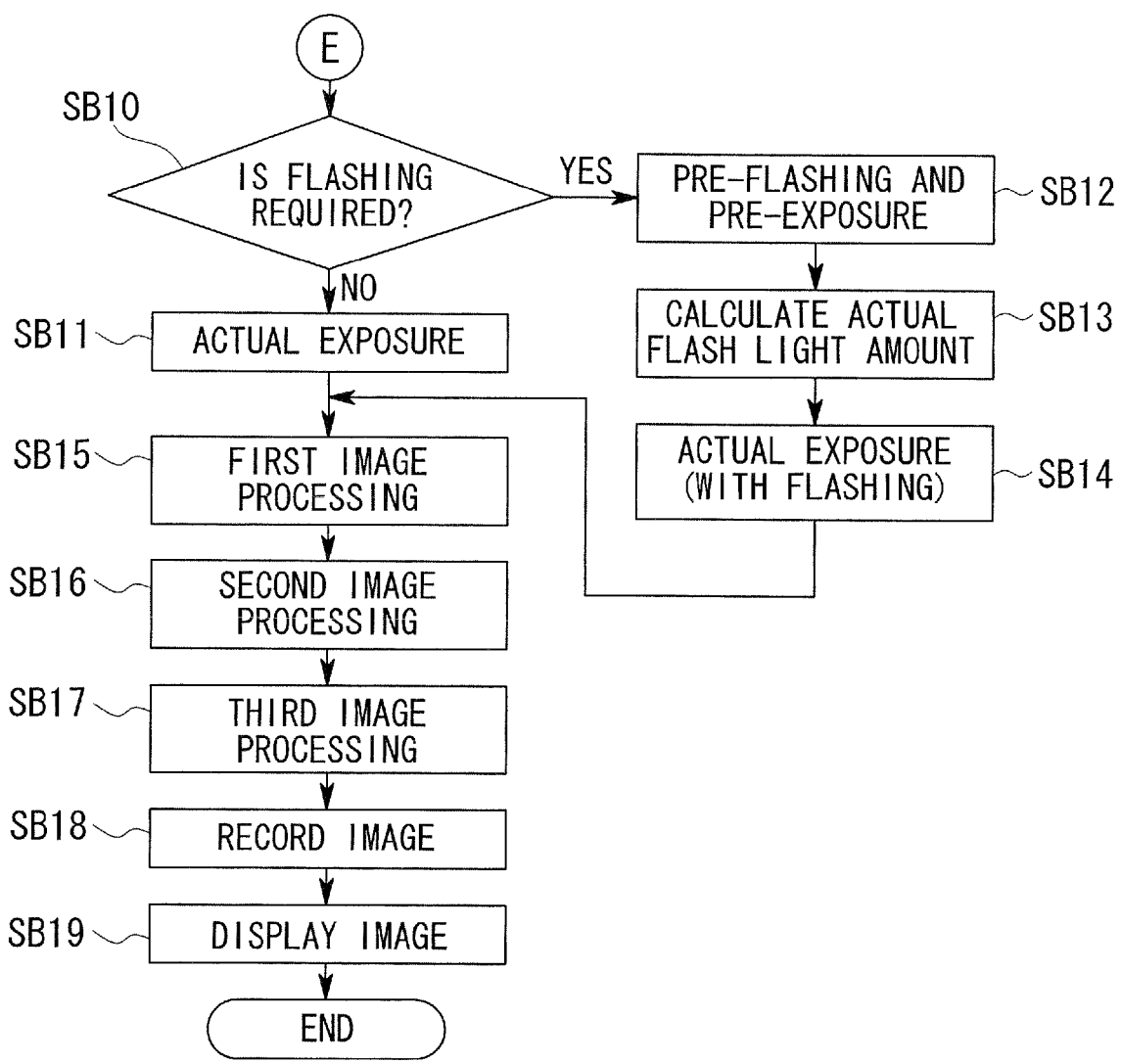
FIG. 3B is a diagram showing a still photography sequence.

Next, the still photography performed in Step SA13 in the above-described display sequence will be described with reference to FIG. 3A and FIG. 3B. FIG. 3A and FIG. 3B is a diagram showing a still photography sequence.

First, in Step SB1 of FIG. 3A, the through-the-lens image signal obtained immediately before is used to perform face detection. In Step SB2, it is judged whether a pre-photographing process is required. To make this judgment, in the through-the-lens image signal obtained immediately before the still photography, the number of pixels whose luminance level is lower than a lower luminance value and the number of pixels whose luminance level is higher than an upper luminance value are counted to count the number of underexposed pixels and the number of overexposed pixels. When the number of underexposed pixels is equal to or smaller than a predetermined threshold and the number of overexposed pixels is equal to or smaller than a predetermined threshold, it is judged that the pre-photographing process is not required because the obtained through-the-lens image signal has a sufficient dynamic range. On the other hand, when the above-mentioned condition is not satisfied, specifically, when either the number of underexposed pixels or the number of overexposed pixels is larger than the corresponding threshold, it is judged that the pre-photographing process is required.

The exposure level for the pre-photographing process is determined by the following conditional expression.

For example, when the number of overexposed pixels is equal to or larger than the predetermined threshold, the exposure level is reduced by a predetermined amount, compared with that for the through-the-lens image photographing performed immediately before. On the other hand, when the number of underexposed pixels is equal to or larger than the predetermined threshold, the exposure level is increased by a predetermined amount, compared with that for the through-the-lens image photographing performed immediately before. Note that, when both the number of underexposed pixels and the number of overexposed pixels are equal to or larger than the respective predetermined thresholds, priority is given to correction of overexposure to reduce the exposure level by the predetermined amount, compared with the preceding photographing.

Note that the lower luminance value, the upper luminance value, the predetermined amount, and the predetermined thresholds, which are used to make a judgment about overexposure or underexposure, can be appropriately specified depending on the performance of the image capturing device 1.

In Step SB3, it is judged whether it has been judged in Step SB2 that the pre-photographing process is required. When the pre-photographing process is required, the pre-photographing process is performed under the exposure condition described above (Step SB4) An image signal obtained in the image capturing unit 2 is converted into a digital signal by the CCD interface 21 and the digital signal is sent to each unit in the image processing device 3.

In Step SB5, automatic focusing is performed. Since the automatic focusing process is the same as that performed in Step SA8 in the display sequence, a description thereof will be omitted.

In Step SB6, a photographing magnification is calculated by the following expression (1) by using the current lens focal distance and a photographing distance obtained in Step SB4.

$$\text{Photographing magnification} = (\text{focal distance})/(\text{photographing distance}) \quad (1)$$

In Step SB7, the luminance distribution of the subject is calculated and the luminance of a subject area and the luminance of a subject surrounding area are calculated using the automatic focusing result and the face detection result. Details of the luminance distribution calculation process will be described later.

In Step SB8, to determine the exposure condition, the target luminance is calculated based on the luminance distribution information of the subject obtained in Step SB7. In Step SB9, the shutter speed, the aperture, and the ISO sensitivity for actual photographing are determined based on the target luminance, and their APEX values (av, tv, and sv) are stored (an exposure condition determining unit).

In Step SB10, it is judged whether flashing is required. For example, at the time of backlight or low luminance, it is judged that flashing is required. When it is judged that flashing is not required, the aperture stop 10*a*, the shutter 11, and the CCD 12 are controlled to perform photographing in Step SB11 under the exposure condition determined in Step SB9. An image signal obtained in the image capturing unit 2 is converted into a digital signal by the CCD interface 21 and the digital signal is sent to each unit in the image processing device 3.

When it is judged in Step SB10 that flashing is required, pre-exposure in which flashing and image capturing are performed is executed in Step SB12, and obtained CCD output data is read and a predetermined process is applied thereto. In Step SB13, luminance distribution information of the subject during the flashing is generated based on the CCD output data obtained in Step SB12, and the amount of flash light is calculated based on the value of the luminance distribution information. In Step SB14, the aperture stop 10*a*, the shutter 11, the stroboscope 15, and the CCD 12 are controlled to perform flashing and photographing under the exposure condition determined in Step SB9 and the amount of flash light calculated in Step SB13. An image signal obtained in the image capturing unit 2 is converted into a digital signal by the CCD interface 21, and the digital signal is sent to each unit in the image processing device 3.

In Step SB15, the first image processing unit 25 applies known OB subtraction and correction, such as white balance correction, to the image signal, and sends the image signal to which those processes have been applied to the second image processing unit 27.

In Step SB16, the second image processing unit 27 applies the gradation conversion process to the image signal sent from the first image processing unit 25 and sends the image signal to which the gradation conversion process has been applied to the third image processing unit 28. Details of the gradation conversion process performed in Step SB16 will be described later.

In Step SB17, the third image processing unit 28 applies various types of image processing, such as color correction, noise correction, YC conversion, and a compression process, to the image signal sent from the second image processing unit 27. In Step SB18, the image to which the image processing has been completely applied is recorded in the recording medium 43. In Step SB19, the image to which the image processing has been completely applied is displayed on the display monitor 46 via the video signal output unit 36 and the like. Note that the various types of image processing, such as the color correction, the noise correction, the YC conversion, and the compression process, are performed after the gradation conversion process in this embodiment, but the order of execution of those processes can be switched depending on the processing speed or the target image quality.

[Luminance Distribution Calculation Process]

Figure 4A:
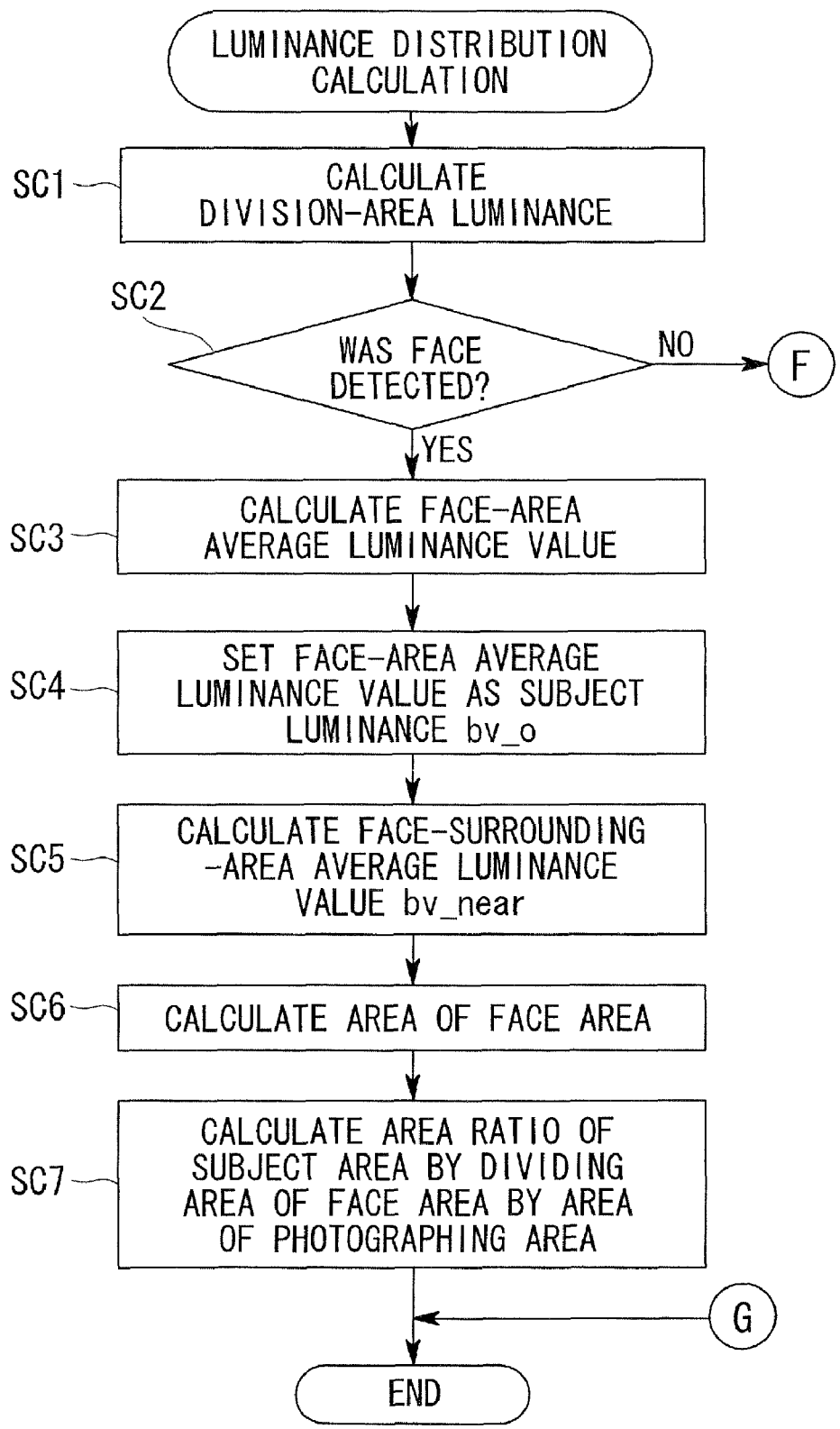
FIG. 4A is a diagram showing a sequence of a luminance distribution calculation process.
Figure 4B:
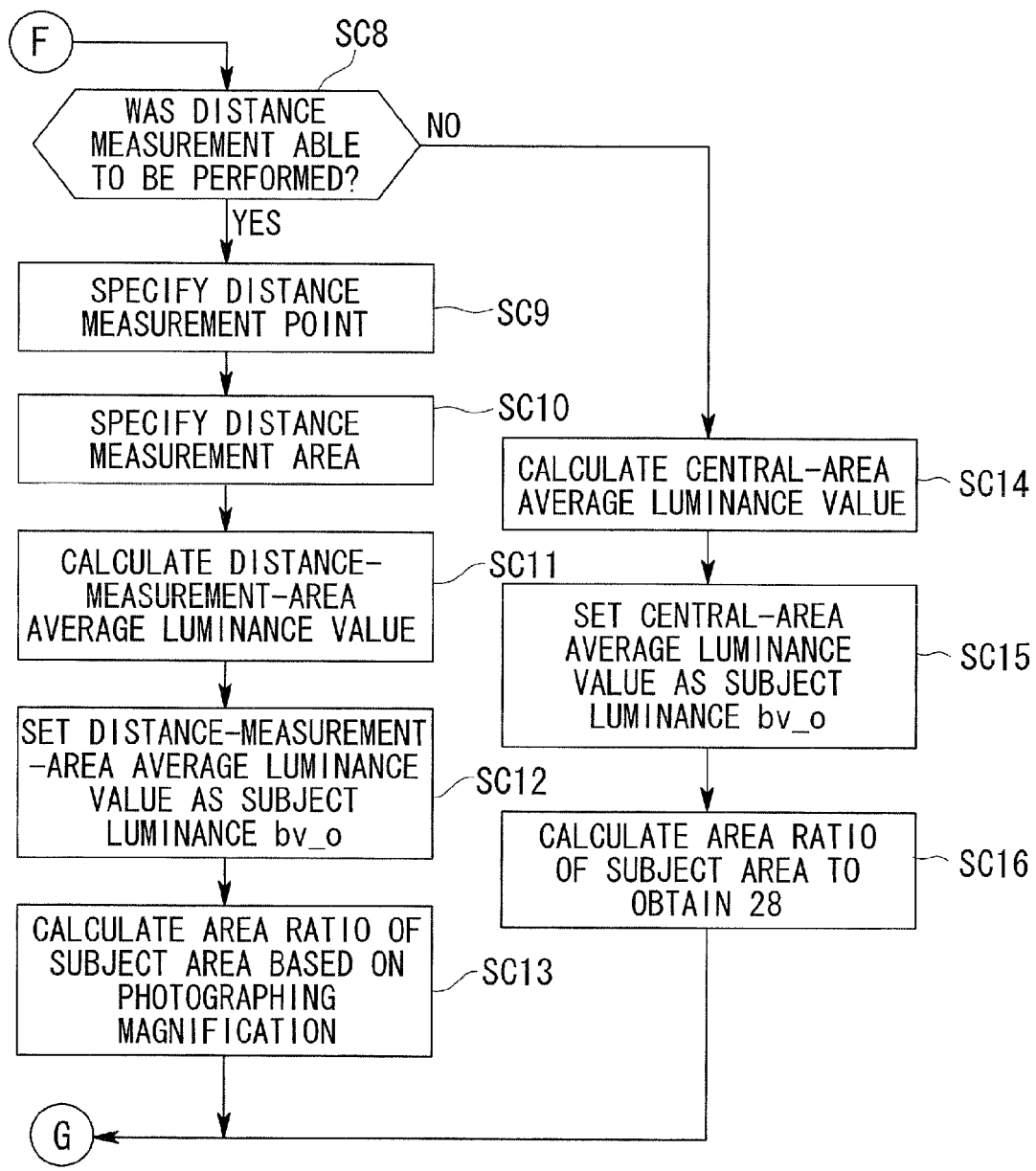
FIG. 4B is a diagram showing a sequence of a luminance distribution calculation process.

Next, the luminance distribution calculation process, performed in Step SB7 in the still photography sequence, will be described in detail with reference to FIG. 4A and FIG. 4B (a subject detecting unit, a subject luminance information acquiring unit, and a luminance distribution calculating unit). FIG. 4A and FIG. 4B is a diagram showing the sequence of the luminance distribution calculation process.

Figure 5:
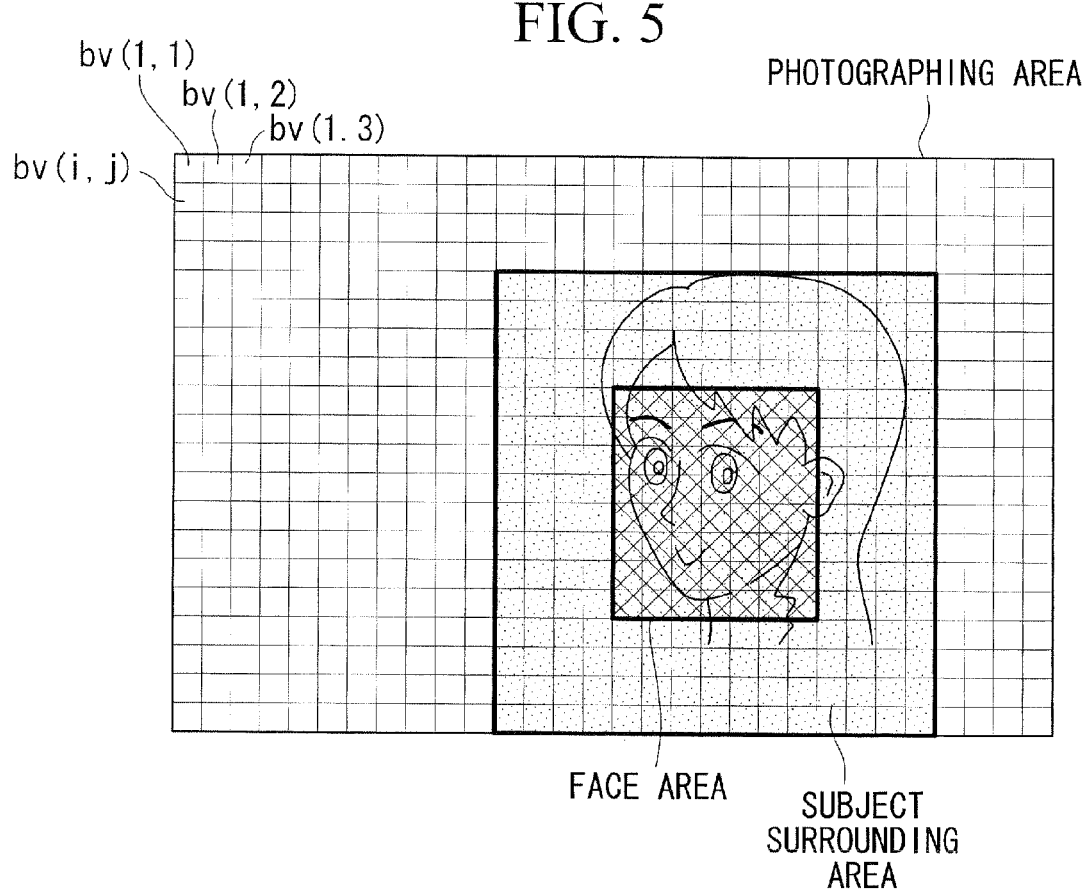
FIG. 5 is an explanatory diagram illustrating a face area and a subject surrounding area when the subject is a face.

In Step SC1, the average luminance value is calculated for each of multiple division areas (in this embodiment, obtained by 30 vertical divisions and 20 horizontal divisions) as shown in FIG. 5, in the image signal. Details of the division-area-luminance calculation process will be described later.

After the average luminance value is calculated for each division area, it is judged in Step SC2 whether a face was detected. Specifically, it is judged whether a face was detected in Step SB1 of FIG. 3A, in the through-the-lens image signal obtained immediately before the still photography. When a face was detected, the operation flow advances to Step SC3.

In Step SC3, a face area is specified based on the position and the size of the detected face, and the average luminance value of the face area is calculated. In Step SC4, the average luminance value of the face area, calculated in Step SC3, is set as a subject luminance bv_o. For example, when the face area is specified as shown in FIG. 5, the average luminance value of 7×7 division areas belonging to the face area is set as the subject luminance bv_o.

In Step SC5, the luminance of a subject surrounding area is calculated based on the information of the face area specified in Step SC3. The subject surrounding area includes 4 division areas immediately outside the face area in each of up, down, right, and left directions. For example, when the face area is specified as shown in FIG. 5, a subject surrounding area which has 15×15 division areas around the face area (excluding the face area) is specified. After the subject surrounding area is specified in this way, the average luminance value of the subject surrounding area is calculated and the calculated average luminance value is set as a subject surrounding luminance bv_near.

In Step SC6, the area of the face area is calculated. In Step SC7, the area ratio of the face area to the photographing area is calculated by using the following expression (2).

$$\text{Area ratio} = (\text{area of face area})/(\text{area of photographing area}) * 100(\%) \quad (2)$$

For example, in the case of the image shown in FIG. 5, the area ratio is calculated as follows.

$$\text{Area ratio} = (7 \times 7 \times (\text{area of one division area}))/(30 \times 20 \times (\text{area of one division area})) = 8.1\%$$

On the other hand, when it is judged in Step SC2 that a face was not detected, the operation flow advances to Step SC8 to judge whether the distance to the subject was able to be measured. In other words, it is judged whether automatic focusing was able to be performed in Step S35 of FIG. 3A. When automatic focusing was able to be performed, it is understood that distance measurement was able to be performed, and the operation flow advances to Step SC9.

In Step SC9, a distance measurement point serving as the area emphasized at the time of distance measurement is specified. In Step SC10, an area having a predetermined size around the distance measurement point is specified as a distance measurement area. In Step SC11, the average luminance value of division areas belonging to the distance measurement area is calculated. In Step SC12, the calculated average luminance value of the distance measurement area is set as the subject luminance bv_o and as the subject surrounding luminance bv_near.

Figure 6:
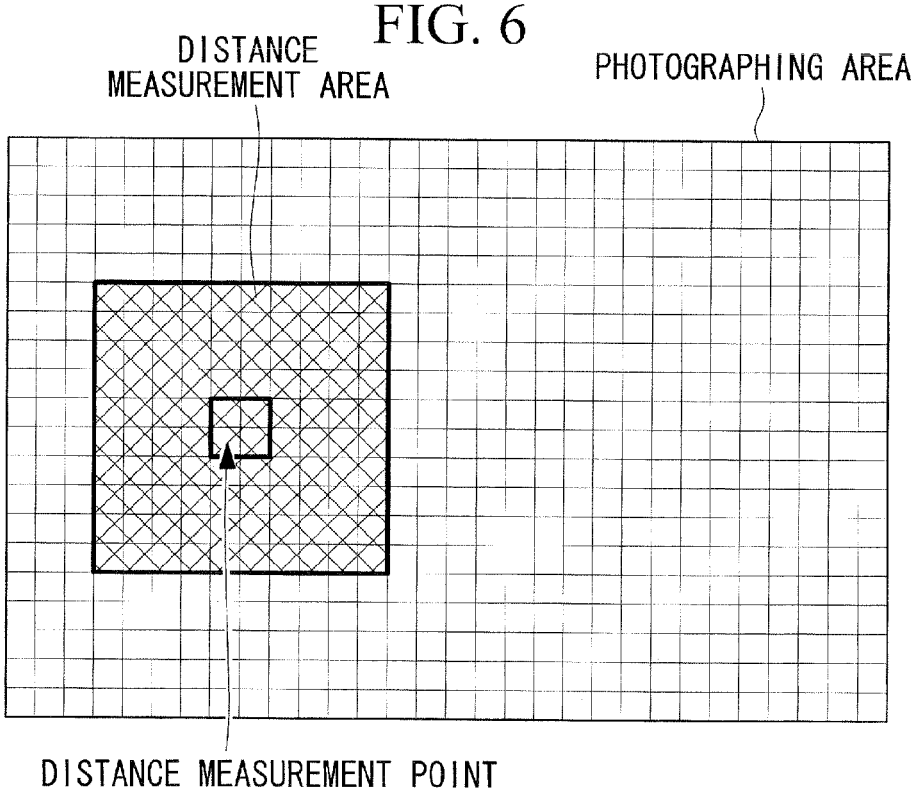
FIG. 6 is an explanatory diagram illustrating a distance measurement area and a distance measurement point when the subject is not a face but distance measurement was able to be performed.

The reason why the subject surrounding luminance bv_near is made equal to the subject luminance bv_o is to specify luminance which causes no process problem because the position of the subject is obtained from distance measurement point information but accurate information on the size of the subject cannot be obtained. FIG. 6 is a diagram showing examples of the distance measurement point and the distance measurement area.

In Step SC13, the area ratio of the distance measurement area (subject area) to the photographing area is calculated using the photographing magnification. For example, the area ratio can be calculated using the following expression (3).

$$\text{Area ratio} = (\text{area of distance measurement area (subject area)})/(\text{area of photographing area}) \quad (3)$$

$$\text{Area of subject area} = (\text{subject magnification} \times 200 \text{ mm})^2$$

$$\text{Subject magnification} = (\text{focal distance})/\text{distance}$$

Figure 7:
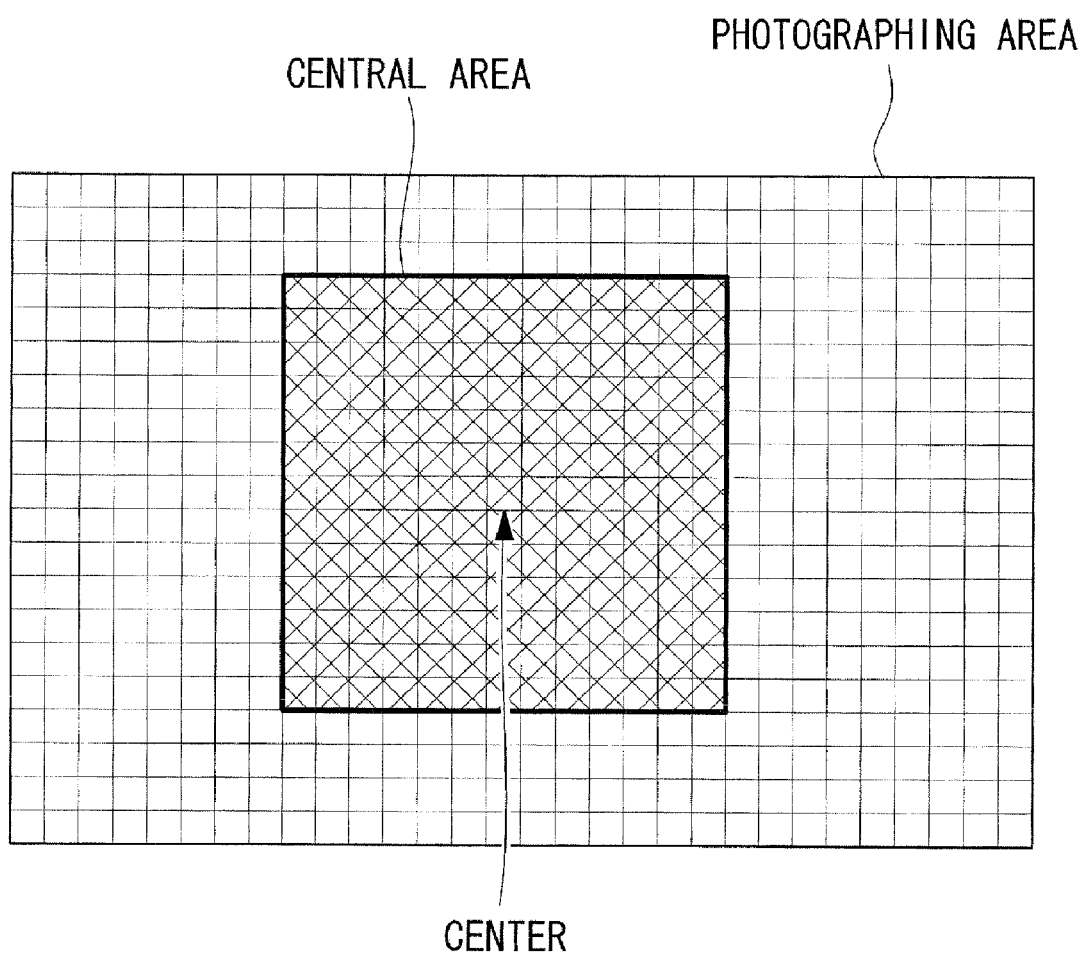
FIG. 7 is an explanatory diagram illustrating a central area when neither the subject is a face nor distance measurement was able to be performed.

On the other hand, when it is judged in Step SC8 that distance measurement was not able to be performed, the operation flow advances to Step SC14. In Step SC14, a central area having a predetermined size is specified at the center of the photographing area as shown in FIG. 7, and the average luminance value of the central area is calculated. In this embodiment, the central area is constituted by 13×13 division areas.

In Step SC15, the average luminance value of the central area is set as the subject luminance bv_o and as the subject surrounding luminance bv_near.

In Step SC16, the area ratio of the central area (subject area) to the photographing area is calculated. The area ratio is calculated by using expression (2).

The luminance distribution calculation process ends when the subject luminance bv_o, the subject surrounding luminance bv_near, and the area ratio are calculated in a case where a face was detected; in a case where a face was not detected but distance measurement was able to be performed; or in a case where neither a face was detected nor distance measurement was able to be performed.

Next, the division-area-luminance calculation process, performed in Step SC1 of the luminance distribution calculation process, will be specifically described with reference to FIG. 8.

Figure 8:
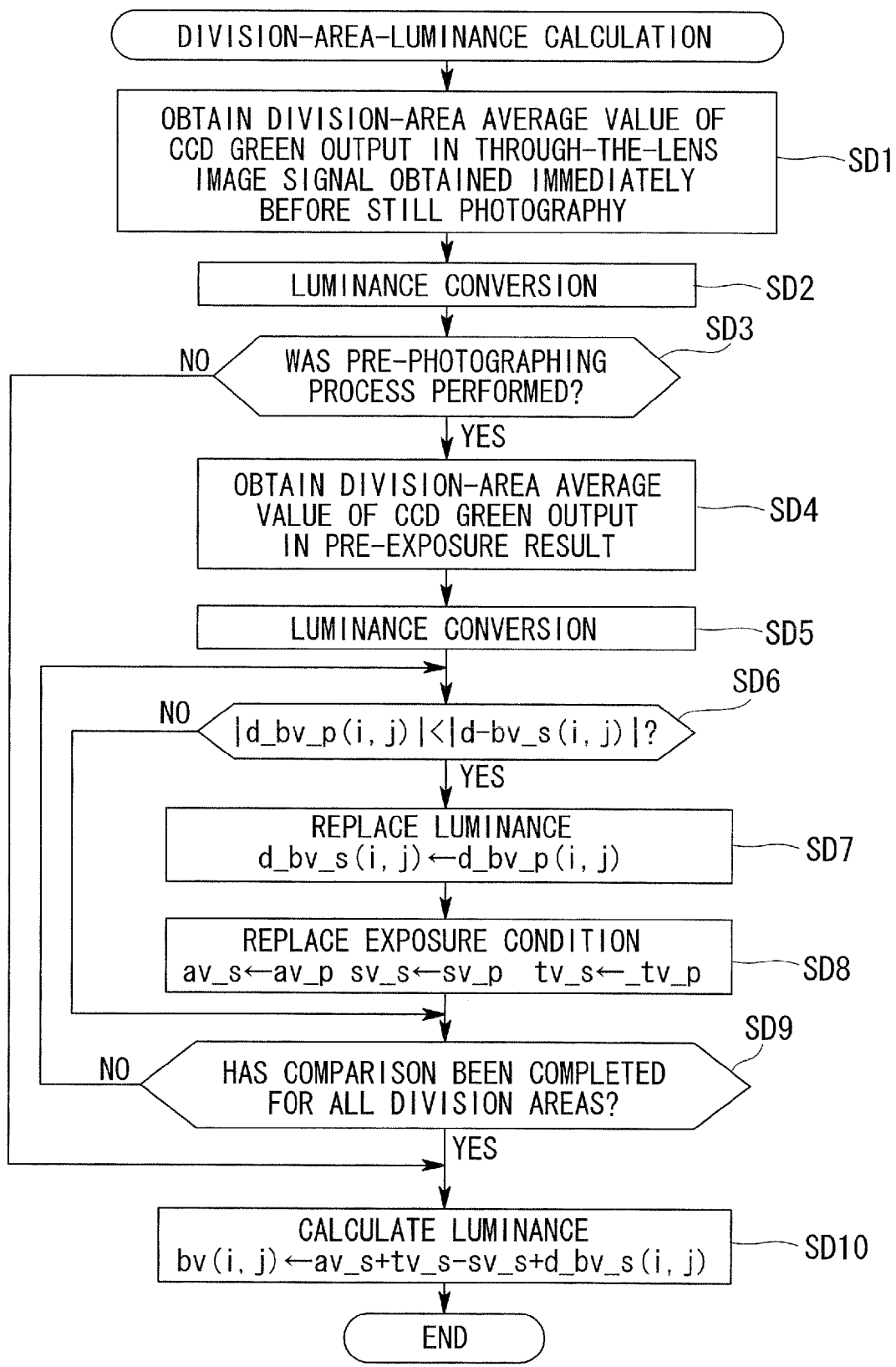
FIG. 8 is a diagram showing a sequence of a division-area luminance calculation process.

FIG. 8 is a diagram showing a sequence of the division-area-luminance calculation process.

First, in Step SD1, the photographing area corresponding to the through-the-lens image signal obtained immediately before the still photography was performed is divided into multiple division areas in a grid-like manner, and the average luminance value of each of the division areas is calculated. In this embodiment, the photographing area Is vertically divided into 30 columns and horizontally divided into 20 rows, as shown in FIG. 5. Further, in each division area, the average luminance value is obtained from the green output signal of the image signal to which the gradation conversion has not been applied.

In Step SD2, the average value of each division area, obtained from the green output signal of the image signal, is calculated by using the exposure condition for the pre-photographing process, and is converted into an APEX luminance signal for the division area.

For example, a luminance signal d_bv_s(i,j) of a division area (i,j) shown in FIG. 5 is given by the following expression (4).

$$d\_bv\_s(i,j) = \log 2(G(i,j)/\text{ref}) \quad (4)$$

In expression (4), G(i,j) represents the average value of the green output signal in the division area (i,j). Further, ref represents a reference green output signal, which is the average green-output value obtained when a light source having a predetermined luminance level is photographed at a predetermined aperture, a predetermined shutter speed, and predetermined sensitivity, and is specified in advance for each camera.

In Step SD3, it is judged whether the pre-photographing process was performed in Step SB4 of the still photography sequence shown in FIG. 3A. When the pre-photographing process was not performed, the APEX values for the through-the-lens image photographing are reflected in the luminance signal d_bv_s(i,j) obtained in Step SD2 to calculate the final luminance signal of each division area (Step SD10).

In other words, when the pre-photographing process was not performed, this indicates that a dynamic image sufficient for a through-the-lens image has been obtained, so a highly-reliable luminance value can be calculated by reflecting the APEX values for the through-the-lens image photographing in the luminance signal d_bv_S(i,j) obtained in Step SD2. The luminance signal of each division area is obtained by the following expression (5).

$$bv(i,j) = (av\_s) + (tv\_s) - (sv\_s) + (d\_bv\_s(i,j)) \quad (5)$$

In expression (5), (av_s), (tv_s), and (sv_s) are APEX values corresponding to the aperture, the shutter speed, and the ISO sensitivity, respectively.

On the other hand, when it is judged in Step SD3 that the pre-photographing process was performed, it is understood that overexposure or underexposure has occurred in the through-the-lens image used to calculate the luminance signal d_bv_s(i,j), and it is also understood that the luminance signal d_bv_s(i,j) is not highly reliable. Therefore, in that case, the information on the image signal obtained through the pre-photographing process is used to correct or change the luminance signal d_bv_s(i,j) obtained in Step SD2, so as to calculate highly-reliable luminance.

Specifically, in Step SD4, the photographing area corresponding to the image signal obtained through the pre-photographing process performed in Step SB4 of FIG. 3A is divided into multiple division areas in a grid-like manner, and the average luminance value of the green output signal in each division area is obtained. In Step SD5, the average luminance value of each division area is calculated by using the exposure condition for the pre-photographing process and is converted into an APEX luminance signal for the division area.

For example, a luminance signal d_bv_p(i,j) of the division area (i,j) shown in FIG. 5 is calculated in the same way as for the through-the-lens image, as described above.

Next, in Step SD6, the luminance signal d_bv_s(i,j) obtained in Step SD2 from the through-the-lens image signal is compared with the luminance signal d_bv_p(i,j) obtained in Step SD5 from the pre-photographing image signal, for each division area. When the absolute value of the luminance signal d_bv_s(i,j) obtained from the through-the-lens image signal is larger than the absolute value of the luminance signal d_bv_p(i,j) obtained from the pre-photographing image signal, the operation flow advances to Step SD7 to replace the luminance signal d_bv_s(i,j) obtained from the through-the-lens image signal with the luminance signal d_bv_p(i,j) obtained from the pre-photographing image signal, in the division area. In short, in such a division area, the luminance signal obtained from the pre-photographing image signal is used. Further, in Step SD8, the APEX values (av_s), (tv_s), and (sv_s) indicating the aperture, the shutter speed, and the ISO sensitivity, for the through-the-lens image photographing, are replaced with the APEX values (av_p), (tv_p), and (sv_p) indicating the respective values above, for the pre-photographing process.

On the other hand, when the condition of Step SD6 is not satisfied, the luminance signal is not replaced, and the operation flow advances to Step SD9.

In Step SD9, it is judged whether the comparison of the luminance signals has been completed for all the division areas. When the comparison has not been completed for all the division areas, the operation flow returns to Step SD6 to perform the processes of Steps SD6 to SD8 for each division area for which the comparison has not been made yet. On the other hand, when the comparison has been completed for all the division areas, the operation flow advances to Step SD10 to calculate the luminance signal of each division area by using expression (5).

As described above, when the APEX values in the exposure condition are reflected, the luminance signal of the subject, which is quantified independently of the exposure condition, can be obtained.

As described above, through the division-area-luminance calculation process, when a pre-photographing process was performed, it is possible to obtain the luminance signal of each division area based on whichever is the more appropriate image signal by comparing the through-the-lens image signal with the image signal obtained through the pre-photographing process. As a result, the luminance signal has a wider dynamic range and becomes highly reliable.

Further, when such a highly-reliable luminance signal is used to perform the luminance distribution calculation process shown in FIG. 4A and FIG. 4B, highly-reliable subject luminance bv_o and subject surrounding luminance bv_near can be obtained.

[Photometric Calculation Process]

Next, the photometric calculation process, performed in Step SB8 of the still photography sequence shown in FIG. 3A, will be described in detail. The photometric calculation process includes a target luminance calculation process (a target luminance calculating unit) shown in FIG. 9A and a target luminance correction process (a target luminance correcting unit) shown in FIG. 12A. In the target luminance calculation process, optimum target luminance is determined to determine a balanced exposure condition which does not cause overexposure or underexposure, based on the luminance signal obtained in the above-described division-area-luminance calculation process. In other words, this process determines target luminance at which hardly any overexposure or underexposure occurs.

Figure 9A:
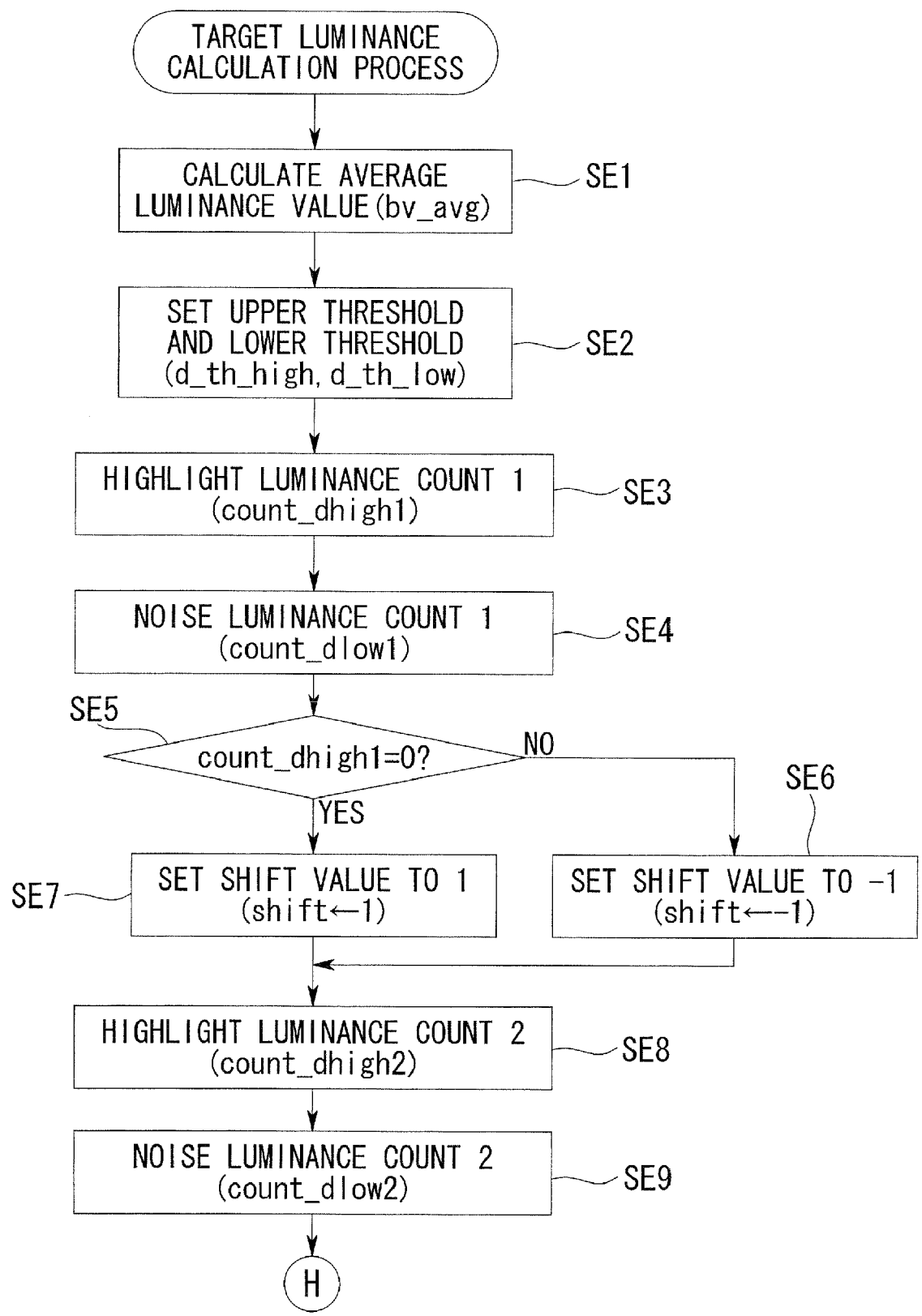
FIG. 9A is a diagram showing a sequence of a target luminance calculation process.
Figure 9B:
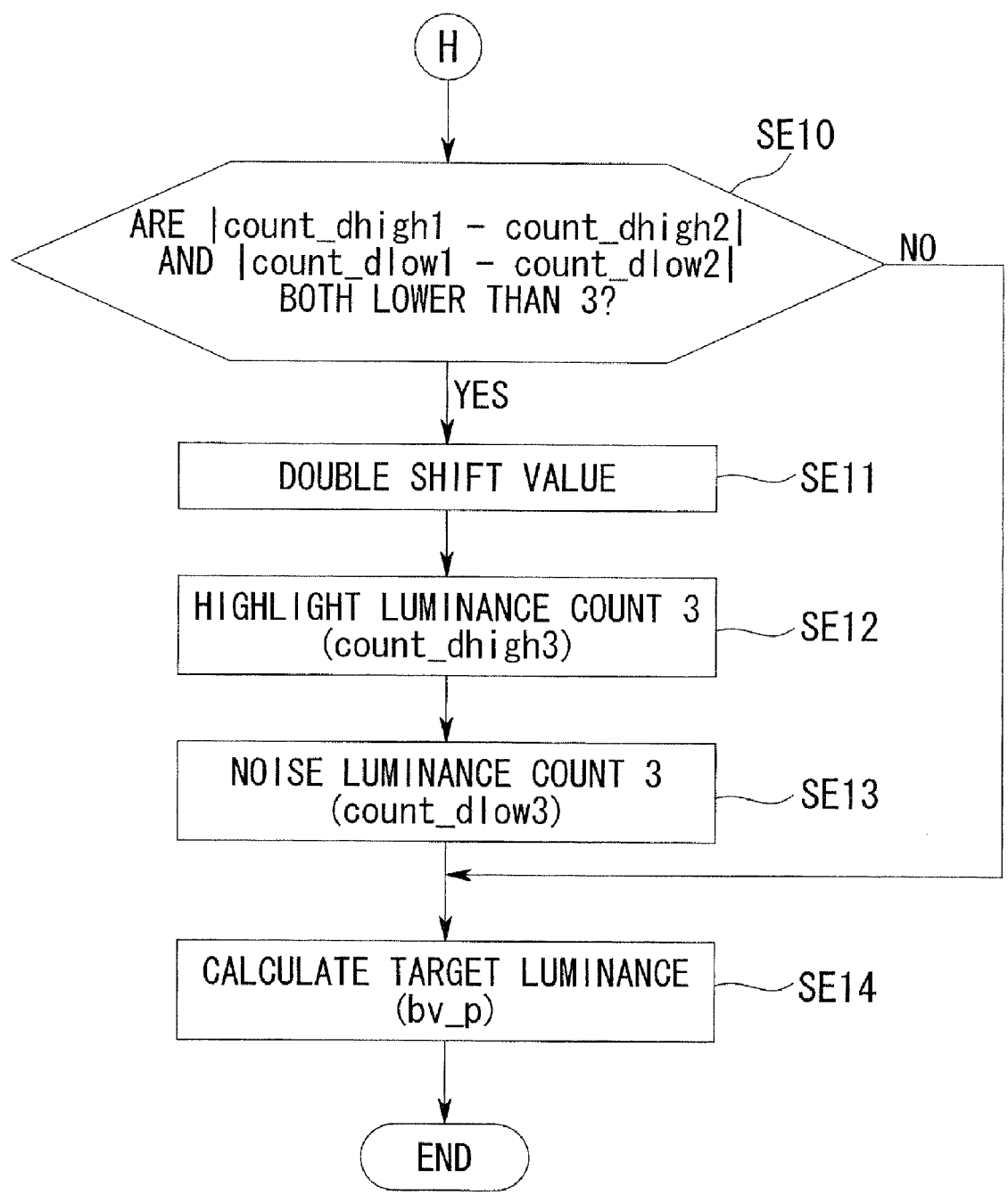
FIG. 9B is a diagram showing a sequence of a target luminance calculation process.

The target luminance calculation process will be described with reference to FIGS. 9A to 11. FIG. 9A and FIG. 9B is a diagram showing a sequence of the target luminance calculation process.

[Target Luminance Calculation Process]

In Step SE1, the average luminance value bv_avg of the entire photographing area is calculated. The average luminance value bv_avg is obtained by calculating the average of the luminance signals of the division areas, obtained in Step SD10 of the division-area-luminance calculation process shown in FIG. 8.

In Step SE2, dynamic range thresholds are set. The dynamic range thresholds are used to judge overexposure and underexposure in the image. In this embodiment, values registered in advance are set. For example, an upper threshold d_th_high for judging overexposure and a lower threshold d_th_low for judging underexposure are set as follows.

$$d\_th\_high=1.5$$

$$d\_th\_low=-2.0$$

In Step SE3, the upper threshold is used to count the number of overexposed (highlight luminance) pixels. Specifically, the number of division areas satisfying the following expression (6) is counted.

$$bv(i,j) > bv\_avg + d\_th\_high \quad (6)$$

In expression (6), bv(i,j) represents the luminance signal of the division area (i,j), bv_avg represents the average luminance value of the entire photographing area, and d_th_high represents the upper threshold.

In Step SE4, the lower threshold is used to count the number of underexposed (noise luminance) pixels. Specifically, the number of division areas satisfying the following expression (7) is counted.

$$bv(i,j) < bv\_avg + d\_th\_low \quad (7)$$

In Step SE5, it is judged whether the count value of overexposed pixels, count_dhigh1 obtained in Step SE3, is equal to zero. When the count value count_dhigh1 is equal to zero, that is, when there is no overexposed division area, the operation flow advances to Step SE6 to set a shift value to −1. On the other hand, when the count value count_dhigh1 is not equal to zero, that is, when there is an overexposed division area, the operation flow advances to Step SE7 to set the shift value to +1. The shift value will be described later.

In Step SE8, the shift value "shift" set in Step SE6 or SE7 is further added to the upper threshold d_th_high for judging overexposure to obtain a new overexposure-judging threshold, and the number of overexposed division areas is counted by using this overexposure-judging threshold. Specifically, the number of division areas satisfying the following expression (8) is counted.

$$bv(i,j) > bv\_avg + shift + d\_th\_high \quad (8)$$

In Step SE9, the shift value "shift" set in Step SE6 or SE7 is further added to the lower threshold d_th_low for judging underexposure to obtain a new underexposure-judging threshold, and the number of underexposed division areas is counted by using this underexposure-judging threshold. Specifically, the number of division areas satisfying the following expression (9) is counted.

$$bv(i,j) < bv\_avg + shift + d\_th\_low \qquad (9)$$

Next, in Step SE10, it is judged whether the absolute value of the difference between the count value count_dhigh1 obtained in Step SE3 and the count value count_dhigh2 obtained in Step SE8 and the absolute value of the difference between the count value count_dlow1 obtained in Step SE4 and the count value count_dlow2 obtained in Step SE9 are both smaller than a predetermined value (in this embodiment, "3").

When the absolute values of the differences are both smaller than the predetermined value, the operation flow advances to Step SE11 to double the currently-set shift value "shift". In Steps SE12 and SE13, the doubled shift value is used to obtain a new overexposure-judging threshold and a new underexposure-judging threshold, and the number of overexposed division areas and the number of underexposed division areas are counted again. The operation flow then advances to Step SE14. On the other hand, when the absolute values of the differences are both equal to or larger than the predetermined value, the operation flow skips Steps SE11 to SE13 and advances to Step SE14. In Step SE14, the target luminance bv_p is calculated by using the results obtained in Steps SE1 to SE13. At the target luminance bv_p, hardly any overexposure or underexposure occurs.

Hereinafter, a target luminance calculation method used in Step SE14 will be described with reference to FIGS. 10 and 11.

Figure 10:
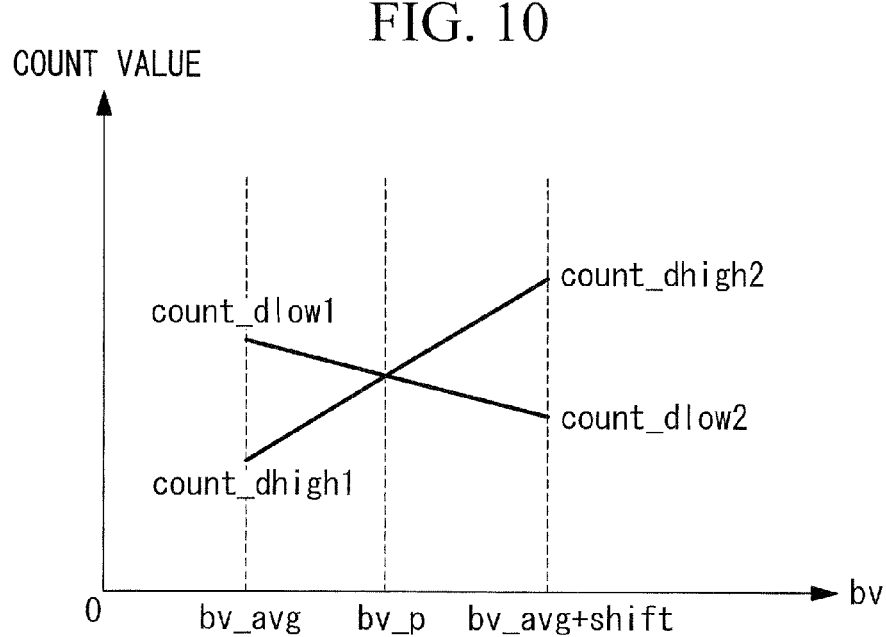
FIG. 10 is an explanatory diagram of a target luminance calculation method.
Figure 11:
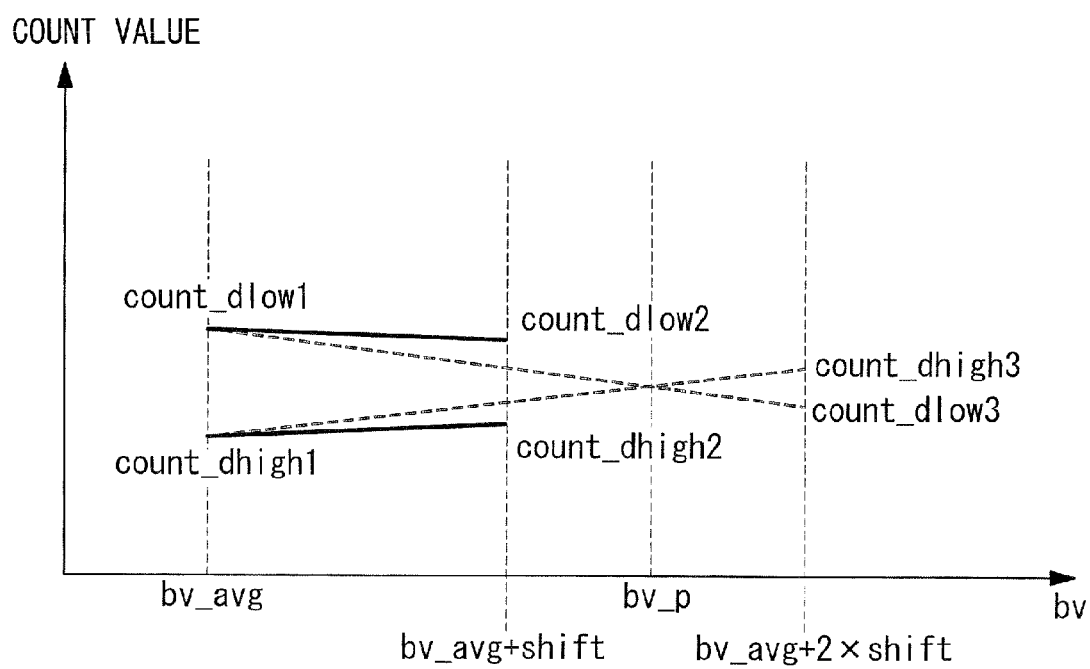
FIG. 11 is an explanatory diagram of a target luminance calculation method.

First, a graph shown in FIG. 10 is generated by using the count values count_dhigh1, count_dlow1, count_dhigh2, and count_dlow2, obtained in Steps SE3, SE4, SE8, and SE9, respectively, and the shift value "shift" set in Step SE6 or SE7.

In FIG. 10, the horizontal axis indicates the luminance bv and the vertical axis indicates the count value. First, the count values count_dhigh1 and count_dlow1 are plotted on a line indicating the average luminance value bv_avg of the entire photographing area, and the count values count_dhigh2 and count_dlow2 are plotted on a line indicating the luminance value obtained by adding the shift value "shift" to the average luminance value bv_avg. FIG. 11 is a graph obtained in the case where the shift value "shift" is set to 1, in other words, in the case where it is judged in Step SE5 of FIG. 9A that there is an overexposed division area. Note that, if the shift value "shift" is set to −1, the line indicating the luminance value obtained by adding the shift value "shift" to the average luminance value bv_avg is shown at the left side of the line indicating the average luminance value bv_avg in FIG. 10.

Next, in the graph of FIG. 10, the count values count_dhigh1 and count_dhigh2, related to overexposure, are connected by a straight line, and the count values count_dlow1 and count_dlow2, related to underexposure, are connected by a straight line. The luminance value at the intersection of these two lines is determined to be a target luminance bv_p.

When the target luminance bv_p is determined in this manner, the number of overexposed division areas and the number of underexposed division areas are balanced.

Note that the reason why the judgment process is provided in Step SE10 of FIG. 9B is because, for example, when the difference between the count values count_dhigh1 and count_dhigh2, related to overexposure, and the difference between the count values count_dlow1 and count_dlow2, related to underexposure, are small, it is difficult to specify the intersection and determine the optimum target luminance bv_p. In that case, the processes of Steps SE11 to SE13 of FIG. 9B are performed, in which the shift value "shift" is doubled and the count values count_dhigh3 and count_dlow3 are obtained, to determine the target luminance bv_p in the same way as described above (see broken lines in FIG. 11).

Note that since it is undesirable, in the determination of the target luminance bv_p, for the target luminance bv_p to be far away from the average luminance value bv_avg of the entire photographing area, when the difference between the average luminance value bv_avg and the target luminance bv_p is equal to or larger than a predetermined value (in this embodiment, |1.5|), the value of the target luminance bv_p is limited to fall in a predetermined range.

The foregoing description is indicated by the following expression (10).

$$bv\_p = bv\_avg + shift \times (count\_dlow1 - count\_dhigh1) / (count\_dhigh2 - count\_dhigh1 - count\_dlow2 + count\_dlow1) \qquad (10)$$

However, when the absolute value of the difference between the target luminance bv_p and the average luminance value bv_avg is larger than 1.5, the target luminance bv_p is obtained by adding 1.5 to the average luminance value bv_avg or by subtracting 1.5 from the average luminance value bv_avg.

[Target Luminance Correction Process]

After the target luminance bv_p is determined in this way, the target luminance correction process (the target luminance correcting unit) is performed to correct the target luminance. In the target luminance correction process, the target luminance bv_p, determined in the above-described target luminance calculation process, is corrected, for example, according to the relationship between the target luminance bv_p and the subject luminance bv_c. When the difference between the target luminance bv_p and the subject luminance bv_o is large, the target luminance bv_p is adjusted according to the condition of the subject. With this process, a target luminance that is balanced with the subject luminance can be obtained.

Figure 12A:
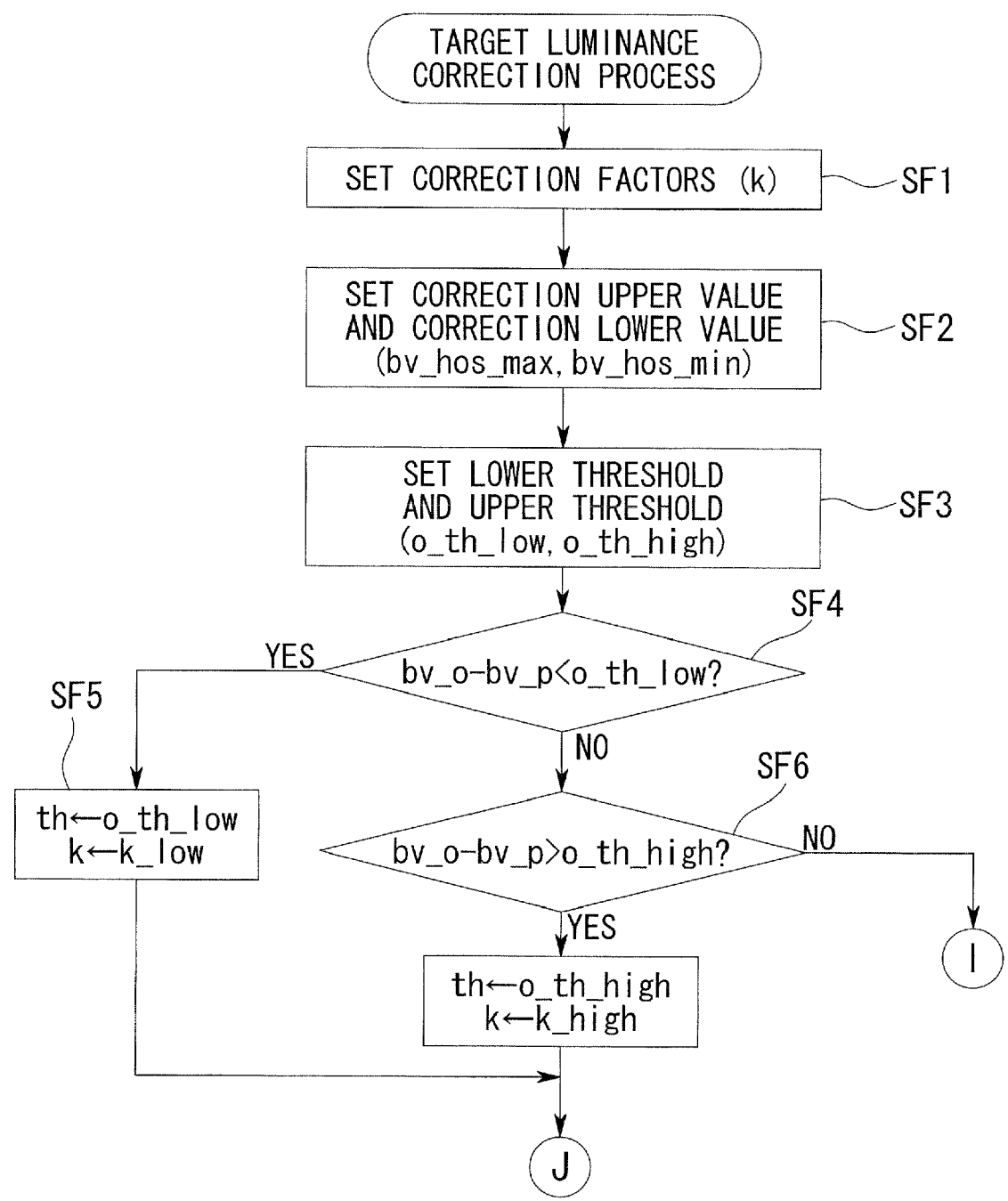
FIG. 12A is a diagram showing a sequence of a target luminance correction process.
Figure 12B:
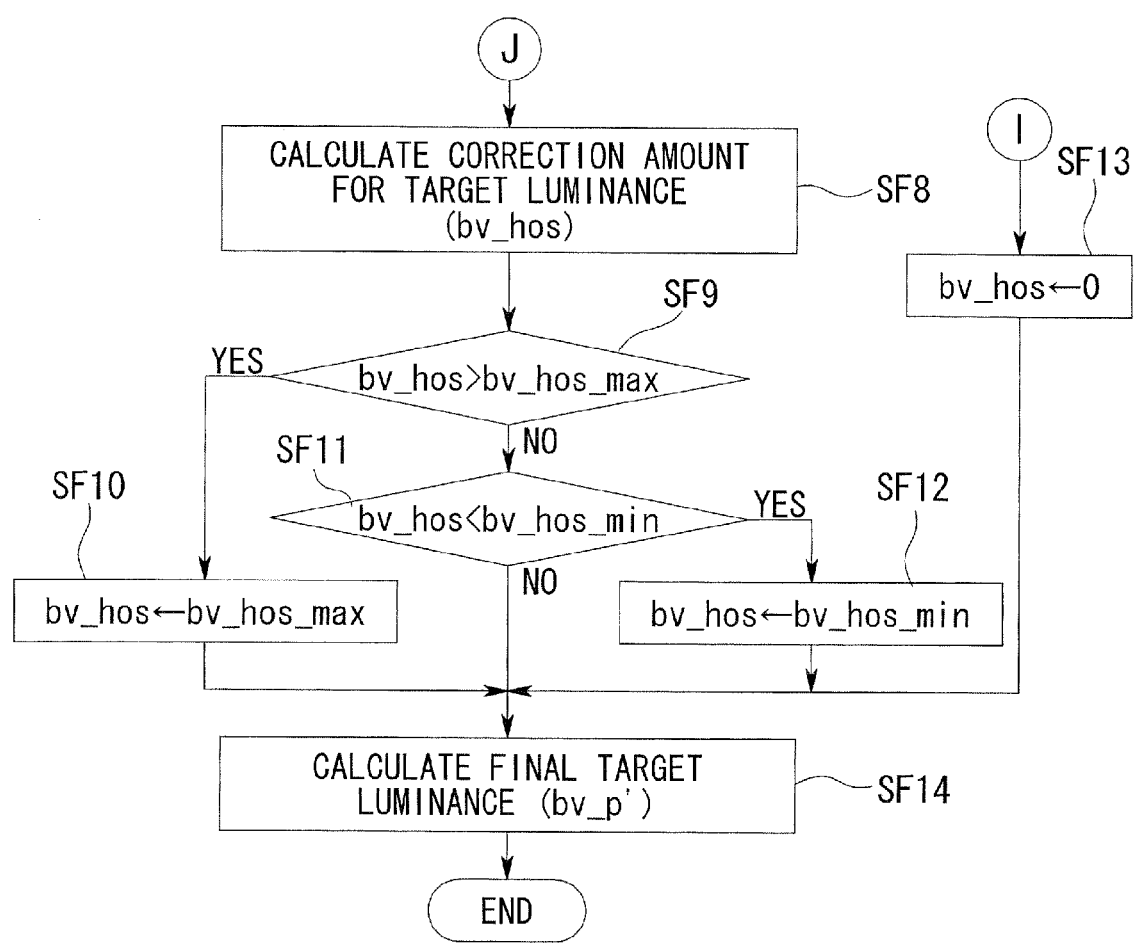
FIG. 12B is a diagram showing a sequence of a target luminance correction process.

Hereinafter, the target luminance correction process will be described with reference to FIG. 12A and FIG. 12B. FIG. 12A and FIG. 12B is a diagram showing a sequence of the target luminance correction process.

First, in Steps SF1 and SF2, correction factors, a correction upper value bv_hos_max, and a correction lower value bv_hos_min for the target luminance bv_p are set. Specifically, a correction factor table shown in FIG. 13 is held in advance, and correction factors k_low and k_high and the correction upper and lower values are set by referring to the correction factor table. As shown in FIG. 13, in this embodiment, when a face was detected in Step SB1 of FIG. 3A, the correction factors k_low and k_high are set according to the following expressions (11-1) and (11-2).

$$k\_low = 0.85 \times (face\_l)/100 \qquad (11\text{-}1)$$

$$k\_high = 0.9 \times (face\_l)/100 \qquad (11\text{-}2)$$

In expressions (11-1) and (11-2), face_l represents the reliability of face detection. For example, an evaluation value obtained by accumulating and normalizing results of comparison with the rectangle filters in the detection process performed in the above-described Viola-Jones face detection method is used as face_l.

Further, the correction upper value bv_hos_max is set to 1.5 and the correction lower value bv_hos_min is set to −2 by referring to the correction factor table.

When a face was not detected but distance measurement was able to be performed, the correction factors k_low and k_high are set to 0.6 and 0.7, respectively, and the correction upper value bv_hos_max is set to 1.0, and the correction lower value bv_hos_min is set to −0.75.

When neither a face was detected nor distance measurement was able to be performed, the correction factors k_low and k_high are set to 0.4 and 0.5, respectively, and the correction upper value bv_hos_max is set to 0.5, and the correction lower value bv_hos_min is set to −0.5. In this embodiment, the two correction factors, k_low and k_high, are prepared and selectively used in Steps SF5 and SF7 to be described below.

As described above, the higher the reliability of accuracy of the subject detection is, the higher the correction factors k_low and k_high are set. Through this setting method of the correction factors k_low and k_high, if the reliability of accuracy of the subject detection is high, the appropriate correction factors k_low and k_high are set according to the luminance of the subject, allowing an image having optimum luminance to be obtained. Further, if the reliability of accuracy of the subject detection is low, moderate correction factors k are set, allowing an image to be obtained which does not have optimum luminance but has its luminance adjusted to some extent. Further, in this embodiment, the correction factors k_low and k_high are prepared and selectively used depending on whether the luminance of the subject is brighter than the target luminance, according to results of judgment in Steps SF4 and SF6 to be described below. The values of the correction factors k_low and k_high are determined while a gradation conversion characteristic used in a process to be performed later is taken into account. In this embodiment, since the gradation conversion characteristic used in the process to be performed later has a tendency to be converted to brighter levels, when the luminance of the subject is darker than the target luminance, the correction factors are set slightly lower and the correction factor k_low is set smaller than the correction factor k_high, with conversion (to brighter levels) by the gradation conversion characteristic being taken into account.

Next, in Step SF3, a lower threshold o_th_low and an upper threshold o_th_high are specified (a criterial range determining unit). The lower threshold o_th_low and the upper threshold o_th_high indicate the range of the difference between the target luminance bv_p and the subject luminance bv_o. When the difference therebetween does not fall in the range, the target luminance bv_p is corrected by using the above-described correction factors k. In this embodiment, the lower threshold o_th_low is set to −1.0 and the upper threshold o_th_high is set to 0.5.

The lower threshold o_th_low and the upper threshold o_th_high are determined while the dynamic range of the image capturing device, noise characteristics, and the gradation conversion characteristic used in the process performed later are taken into account. Further, since the dynamic range of the image capturing device is narrowed in general at a bright side with respect to the target output level to be achieved by the exposure, it is preferable that the absolute value of the upper threshold be set smaller than the absolute value of the lower threshold.

Next, in Step SF4, it is judged whether the difference between the target luminance bv_p and the subject luminance bv_o is smaller than the lower threshold o_th_low. When the difference therebetween is smaller than the lower threshold o_th_low, the lower threshold o_th_low is set as a variable th which is taken into account in calculating a correction amount bv_hos, and the correction factor k_low is set as the correction factor k (Step SF5). Then, the operation flow advances to Step SF8. On the other hand, when the difference between the target luminance bv_p and the subject luminance bv_o is equal to or larger than the lower threshold, it is judged whether the difference therebetween is larger than the upper threshold o_th_high (Step SF6). When the difference therebetween is larger than the upper threshold o_th_high, the upper threshold o_th_high is set as the variable th and the correction factor k_high is set as the correction factor k (Step SF7). Then, the operation flow advances to Step SF8. In Step SF8, the correction amount bv_hos for the target luminance bv_p is calculated by using the following expression (12) (a correction amount determining unit).

$$bv\_hos = k \times (bv\_o - bv\_p - th) \quad (12)$$

Next, it is judged whether the correction amount bv_hos falls in the range from the correction lower value bv_hos_min to the correction upper value bv_hos_max (Steps SF9 and SF11). When the correction amount bv_hos is smaller than the correction lower value bv_hos_min, the correction amount bv_hos is set to the correction lower value bv_hos_min (Step SF12). When the correction amount bv_hos is larger than the correction upper value bv_hos_max, the correction amount bv_hos is set to the correction upper value bv_hos_max (Step SF10).

On the other hand, when it is judged in Step SF4 that the difference between the target luminance bv_p and the subject luminance bv_o is equal to or larger than the lower threshold o_th_low and it is judged in Step SF6 that the difference therebetween is equal to or smaller than the upper threshold o_th_high, the operation flow advances to Step SF13 to set the correction amount bv_hos to zero. In short, in that case, the target luminance bv_p is not corrected.

In Step SF14, the target luminance bv_p is corrected by using the correction amount bv_hos obtained as described above to obtain a final target luminance bv_p'. The final target luminance bv_p' is obtained by the following expression (13).

$$bv\_p' = bv\_p + bv\_hos \quad (13)$$

Figure 14:
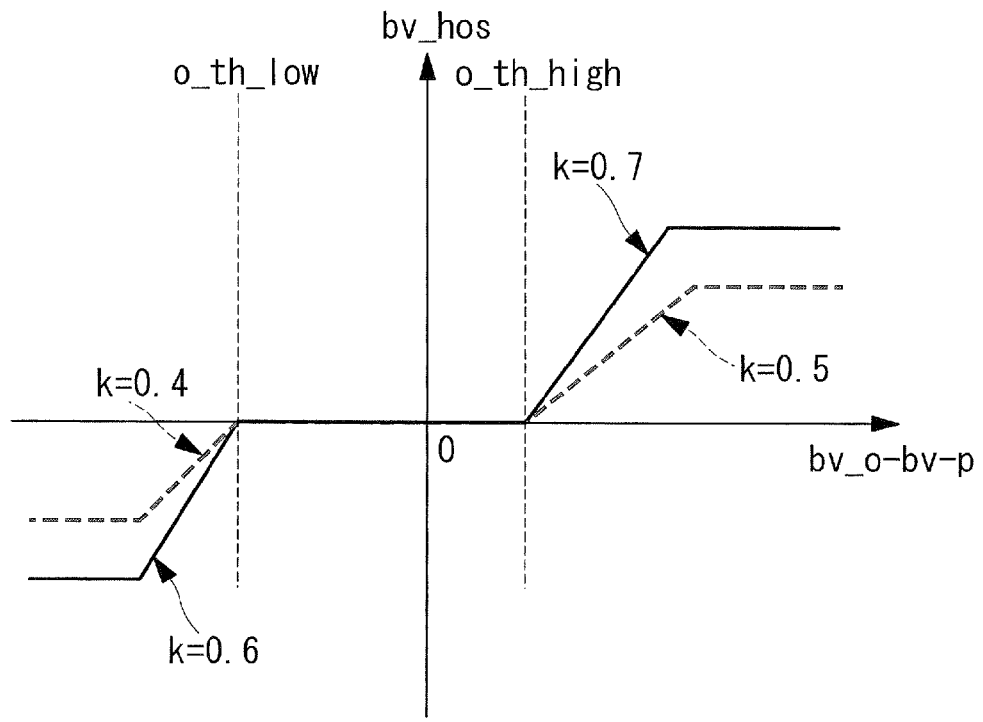
FIG. 14 is a graph showing the relationship between a correction amount obtained in the target luminance correction process and the difference between the target luminance and the subject luminance.

FIG. 14 is a graph showing the relationship between the correction amount bv_hos obtained in the above-described target luminance correction process and the difference between the target luminance bv_p and the subject luminance bv_o (hereinafter referred to as "luminance difference") In FIG. 14, the horizontal axis indicates the luminance difference and the vertical axis indicates the correction amount. When the luminance difference is equal to or larger than the lower threshold and is equal to or smaller than the upper threshold, the correction amount is zero. When the luminance difference is smaller than the lower threshold or is larger than the upper threshold, the correction amount is set based on a predetermined correction factor k decided by referring to FIG. 13 and is fixed when the correction amount reaches the correction lower value or the correction upper value. When the luminance difference is smaller than the lower threshold or is larger than the upper threshold and when the correction amount does not reach the correction lower value or the correction upper value, the correction factor k indicates the gradient of the correction amount. The gradient is changed between when the luminance difference is smaller than the lower threshold and when the luminance difference is larger than the upper threshold, so as to change the degree of emphasis of the subject luminance bv_o.

After the final target luminance bv_p' is determined as described above, the shutter speed, the aperture, and the ISO sensitivity for actual photographing are determined in the exposure calculation (Step SB9) shown in FIG. 3A so as to realize the final target luminance bv_p'. The still photography (actual photographing) is performed under the determined exposure condition (see Steps SB9 to SB14 of FIG. 3A and FIG. 3B).

[Second Image Processing]

Figure 15:
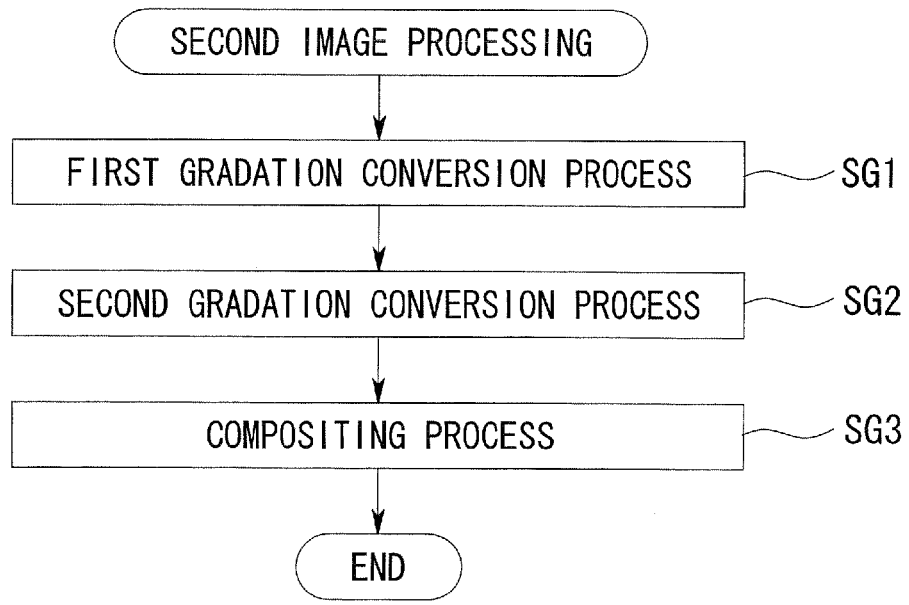
FIG. 15 is a diagram showing a sequence of second image processing.

Next, a description will be given of the gradation conversion process applied by the second image processing unit (an image processing unit) 27 to the image signal obtained through still photography, for which the exposure has been adjusted as described above. The gradation conversion process is applied in Step SB16 of FIG. 3B. FIG. 15 is a diagram showing a sequence of the second image processing. As shown in FIG. 15, in the gradation conversion process, a first gradation conversion process is applied to the image signal to which the OB correction and the like have been applied by the first image processing unit 25 (see FIG. 1) (Step SG1). In the first gradation conversion process, a reference gradation conversion characteristic curve γ2 (see FIG. 19) set in advance is used to apply a uniform gradation conversion process to the image signal. The image signal obtained through the first gradation conversion process is stored as a first image signal in a predetermined memory, for example, in the recording medium 43 shown in FIG. 1.

Next, a second gradation conversion process is applied (Step SG2).

[Second Gradation Conversion Process]

Figure 16:
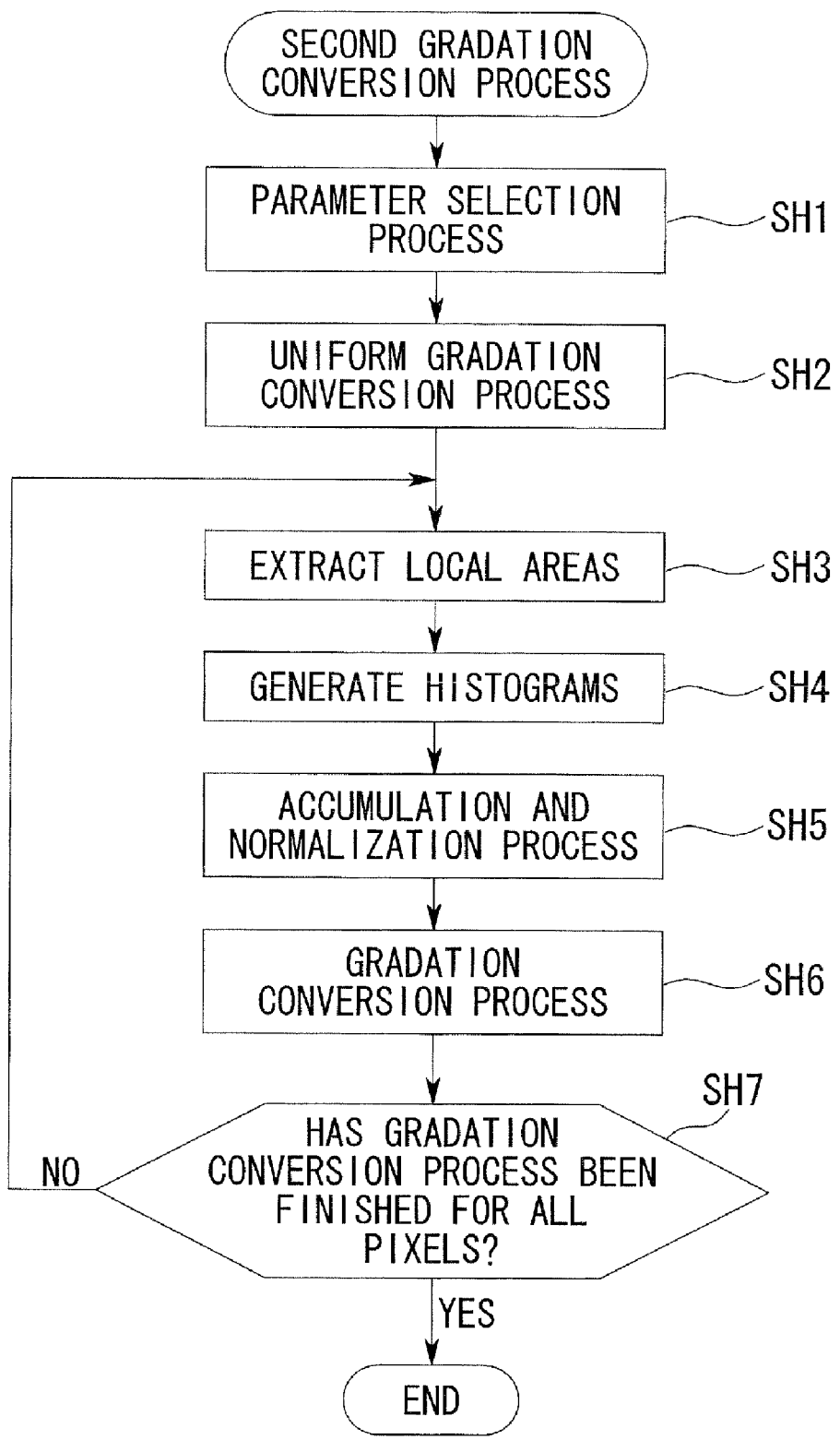
FIG. 16 is a diagram showing a sequence of a second gradation conversion process.

In the second gradation conversion process, a uniform gradation conversion process is applied to the image signal obtained through the first gradation conversion process, and then, a local gradation conversion process is further applied. Hereinafter, the second gradation conversion process will be briefly described with reference to FIG. 16. FIG. 16 is a diagram showing a sequence of the second gradation conversion process.

First, parameters to be used for the second gradation conversion process are selected (Step SH1). Various types of parameters are selected, such as a gradation conversion characteristic curve (hereinafter referred to as "γ characteristic") used for the uniform gradation conversion and a compositing ratio used for a compositing process to be performed at a later stage. Details of a process of selecting the parameters will be described later.

Next, the γ characteristic determined in the parameter selection process is used to perform the uniform gradation conversion process (Step SH2). Next, local areas having a predetermined size determined in the parameter selection process are sequentially extracted around a pixel of interest (Step SH3). The histograms of the local areas are generated (Step SH4). The histograms are accumulated and normalized to create a gradation conversion curve (Step SH5). The gradation conversion process is applied to the pixel of interest based on the gradation conversion curve (Step SH6). It is then judged whether the gradation conversion process has been finished for all pixels (Step SH7). If the gradation conversion process has not been finished for all the pixels, local areas are extracted for the next pixel of interest, and the processes of Step SH3 and the subsequent steps are repeated. When the gradation conversion process has been finished for all the pixels, the image eventually obtained is stored in a memory as a second image signal, and the second gradation conversion process ends.

The Steps SH3 to SH7 correspond to the local gradation conversion process.

Then, the first image signal, obtained through the first gradation conversion process, and the second image signal, obtained through the second gradation conversion process, are combined with the compositing ratio selected in the parameter selection process. The combined image signal is output to the third image processing unit 28 (see FIG. 1) as a final image signal obtained through the gradation conversion (Step SG3 of FIG. 15). Then, the second image processing ends.

[Parameter Selection Process]

Figure 17A:
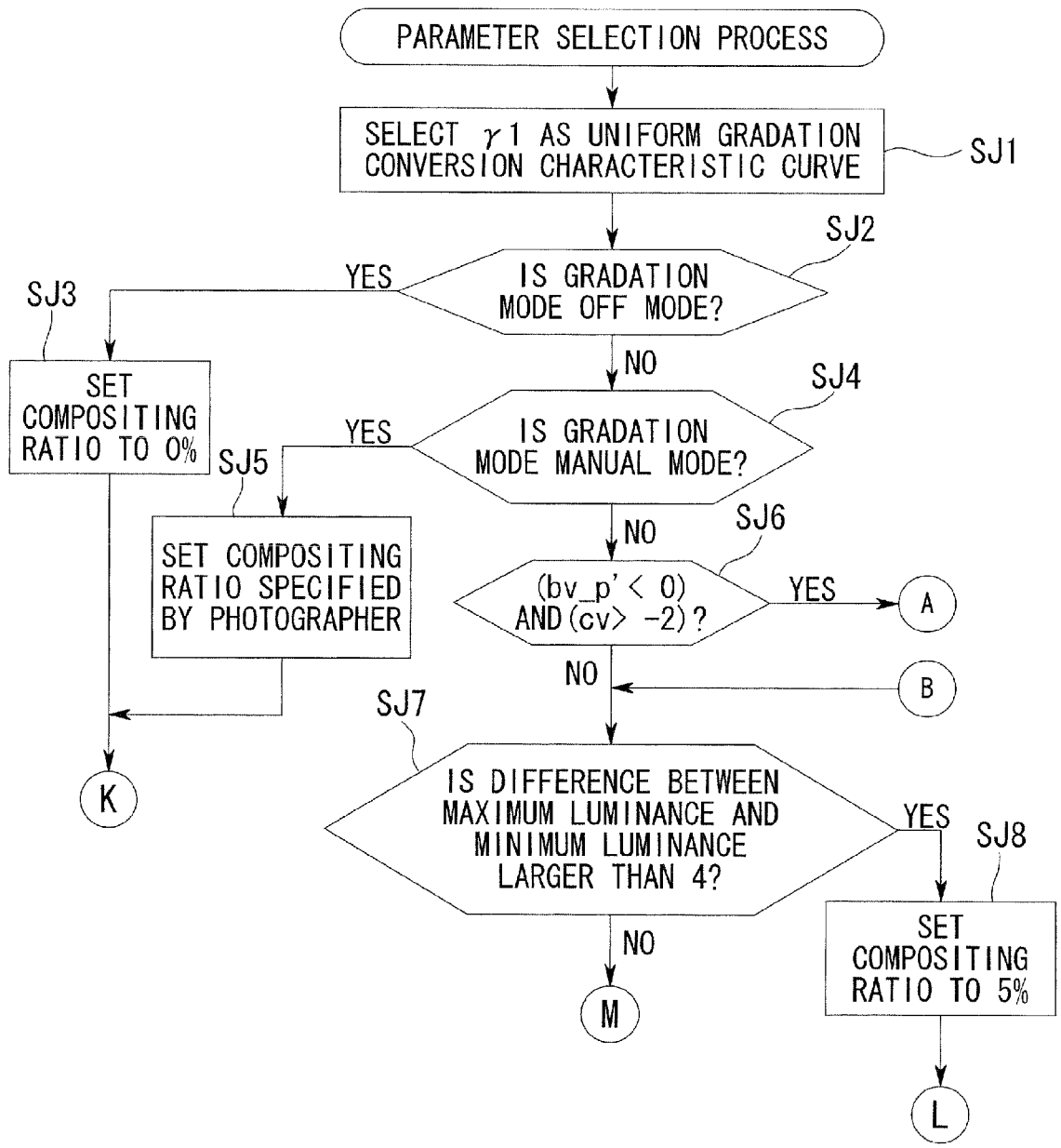
FIG. 17A is a diagram showing a sequence of a parameter selection process.
Figure 18:
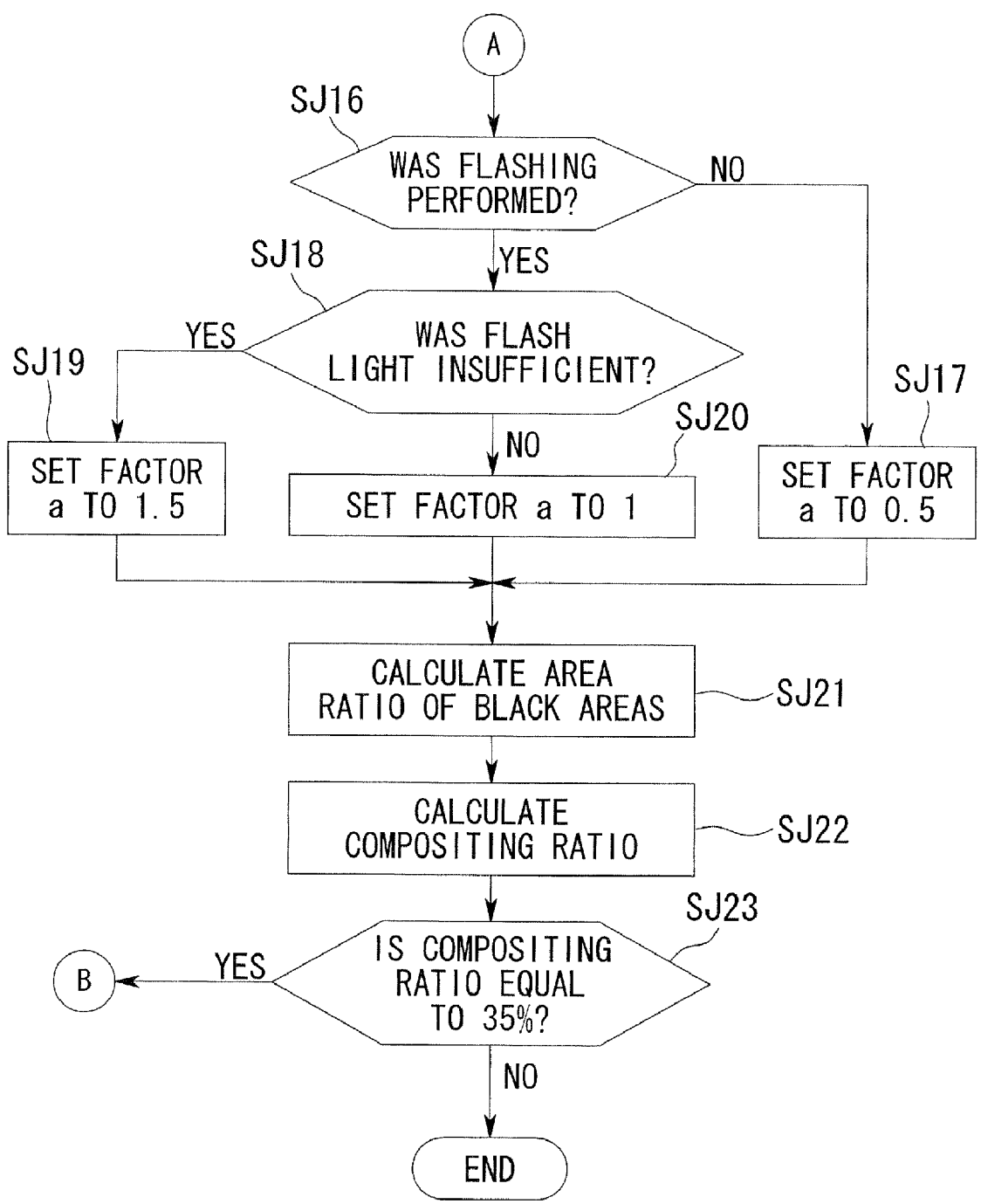
FIG. 18 is a diagram showing the sequence of the parameter selection process.

Next, the parameter selection process, performed in Step SH1 of FIG. 16, will be described in detail. FIGS. 17A and 18 are diagrams showing a sequence of the parameter selection process.

Figures 19, 20:
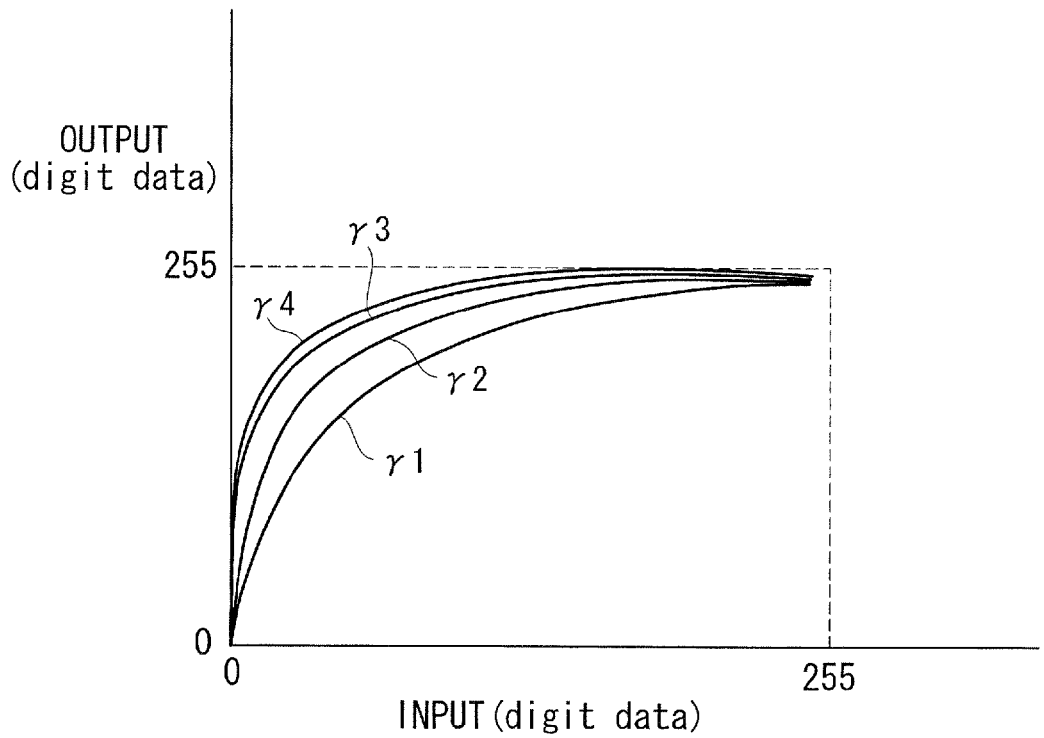
FIG. 19 is a diagram showing example gradation conversion characteristic curves.
FIG. 20 is a diagram showing the relationship between the gradation conversion characteristic curves and the differences between subject luminance and subject surrounding luminance.

First, the γ characteristic used for the uniform gradation conversion process is selected from multiple γ characteristics, γ1 to γ4, shown in FIG. 19 (Step SJ1). In this embodiment, γ1 is selected. In the y characteristics, γ1 indicates a dark and gentle characteristic having lowest contrast, and γ2, γ3, and γ4 indicate brighter characteristics having higher contrast in ascending order. Next, it is judged whether the gradation mode is the off mode (Step SJ2 of FIG. 17A). This judgment is made by referring to the judgment result of Step SA1 of FIG. 2A. When the gradation mode is the off mode, the compositing ratio is set to zero (Step SJ3) and the parameter selection process ends.

In contrast, when the gradation mode is not the off mode, it is judged whether the gradation mode is the manual mode (Step SJ4). When the gradation mode is the manual mode, the compositing ratio set by the photographer is read and set (Step SJ5). Then, the parameter selection process ends.

When the gradation mode is not the manual mode, in other words, when the gradation mode is the automatic mode, it is judged whether the subject or the vicinity of the subject are dark in the image obtained through the still photography. Specifically, it is judged whether the final target luminance bv_p' is smaller than zero and an exposure correction amount cv is larger than −2 (Step SJ6). The exposure correction amount cv is information set through the operation unit 47 (see FIG. 1) when the photographer desires to change the exposure. When the condition of Step SJ6 is not satisfied, in other words, when the subject and the vicinity thereof are not dark, the operation flow advances to Step SJ7.

In Step SJ7, it is judged whether the difference between the maximum luminance and the minimum luminance of the image signal is larger than a predetermined value (in this embodiment, 4). When the difference therebetween is larger than the predetermined value, the compositing ratio is set to 5% (Step SJ8). When the difference therebetween is smaller than the predetermined value, it is judged whether the photographing magnification is larger than /1;10(Step SJ9). When the photographing magnification is larger than /1;10the compositing ratio is set to 20% (Step SJ10). When the photographing magnification is not larger than /1;10it is judged whether the F value is smaller than F2, in other words, whether the background in the image is defocused (Step SJ11). When the F value is smaller than F2, the compositing ratio is set to 20% (Step SJ10). When the F value is not smaller than F2, it is judged whether the area ratio of the subject area to the photographing area is 30% or more (Step SJ12). When the area ratio of the subject area to the photographing area is 30% or more, the compositing ratio is set to 35% (Step SJ13). When the area ratio of the subject area to the photographing area is less than 30%, the operation flow advances to Step SJ14.

In Step SJ14, the y characteristic used for the uniform gradation conversion process, set in Step SJ1, is changed. For example, when the subject area is relatively small (less than 30%), the local gradation conversion process achieves a slight advantage. Even when such a scene is subjected to the local gradation conversion process, it is difficult to obtain a desirable image. In that case, the γ characteristic used for the uniform gradation conversion process, which is applied before the local gradation conversion process, is changed and then the local gradation conversion process is applied, so that an image with a desirable image quality can be obtained. In this case, it is preferable that the photographed scene be taken into account to select a more appropriate γ characteristic. Further, as will be described in Step SJ15, the compositing ratio is increased to increase the brightness, so that the local gradation conversion process can achieve a greater advantage.

Specifically, as shown in FIG. 20, when the difference between the subject luminance bv_o and the subject surrounding luminance bv_near is equal to or larger than a predetermined value th2, γ2 is selected. When the difference therebetween is equal to or larger than a predetermined value th1 and is smaller than the predetermined value th2, γ3 is selected. When the difference therebetween is smaller than the predetermined value th1, γ4 is selected. The γ characteristics are shown in FIG. 19. As described above, a photographed scene is taken into account to select a more appropriate γ characteristic.

Figure 21:
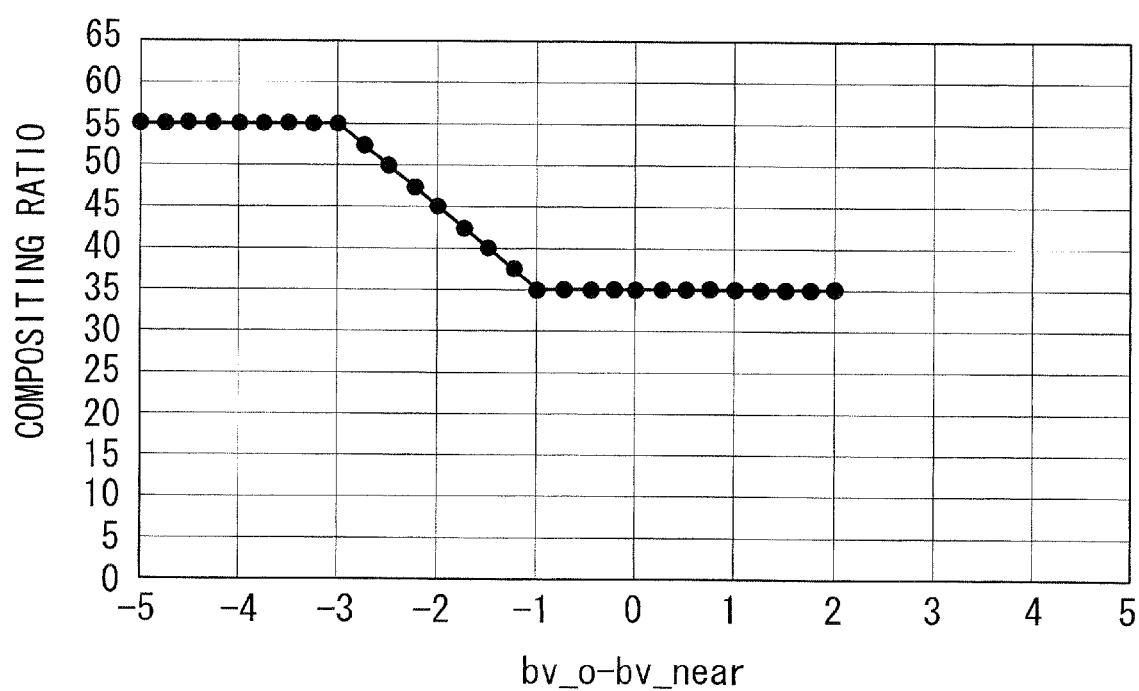
FIG. 21 is a diagram showing the relationship between a compositing ratio and the difference between subject luminance and subject surrounding luminance.

In Step SJ15, the compositing ratio is determined. Specifically, as shown in FIG. 21, when the difference between the subject luminance bv_o and the subject surrounding luminance bv_near is equal to or smaller than −3, the compositing ratio is set to 55%. When the difference therebetween is equal to or larger than −1, the compositing ratio is set to 35%. When the difference therebetween is larger than −3 and is smaller than −1, the compositing ratio is set by using the following expression (14).

$$\text{Compositing ratio} = -(bv\_o - bv\_near + 1) \times 10 + 35 \qquad (14)$$

When the compositing ratio is determined as described above, the parameter selection process ends.

On the other hand, when it is judged in Step SJ6 that the subject and the vicinity of the subject are dark in the image obtained through the still photography, in other words, when it is judged that the condition of Step SJ6 is satisfied, the operation flow advances to Step SJ16 of FIG. 18. In Step SJ16, it is judged whether flashing was performed at the time of the still photography. If flashing was not performed, a factor "a" which is required to determine the compositing ratio is set to 0.5 (Step SJ17). Then, the operation flow advances to Step SJ21.

On the other hand, when it is nudged in Step SJ16 that flashing was performed, it is judged whether the flash light was insufficient (Step SJ18). Since information indicating that the flash light did not reach the area is generated when it is judged, when calculating the amount of flash light in Step SB13 of FIG. 3B, that the amount of flash light is insufficient even if the flash light is fully emitted, the judgment as to whether the flash light was insufficient is made by checking whether the information has been generated. If the flash light was insufficient, the factor "a" is set to 1.5 (Step SJ19) and the operation flow advances to Step SJ21. On the other hand, if the flash light was sufficient, the factor "a" is set to 1 (Step SJ20) and the operation flow advances to Step SJ21.

In Step SJ21, the area ratio of black areas in the image signal obtained through the still photography (the ratio of the area of underexposed areas to that of the photographed image) Is calculated. Specifically, the average value of a Y output in each of predetermined division areas is calculated in the image signal obtained through the still photography. The number of division areas whose average value of the Y output is smaller than a black judgment threshold dark_th is counted to count the number of underexposed division areas. The number of underexposed division areas is divided by the total number of division areas in the image and the result is expressed as a percentage, thereby obtaining the area ratio dark_area (%) of the black areas.

The black judgment threshold dark_th is determined based on the ISO sensitivity, the factor "a", the reference threshold ref, and reference ISO sensitivity ref_iso. Specifically, the black judgment threshold dark_th is given by the following expression (15).

$$\text{dark\_th} = iso \times a \times \text{ref} / \text{ref\_iso} \qquad (15)$$

Next, the compositing ratio is determined in Step SJ22. The compositing ratio is obtained by the following expression (16) by using the area ratio dark_area of black areas.

$$\text{Compositing ratio} = (100 - \text{dark\_area}) \times 35/100 \qquad (16)$$

Then, it is judged whether the compositing ratio is 35% (Step SJ23). When the compositing ratio is less than 35%, the parameter selection process ends. When the compositing ratio is 35%, the operation flow returns to Step SJ7 to perform the processes of Step SJ7 and the subsequent steps.

Even when photographing was performed at a low luminance level, if the compositing ratio is high, the actually-obtained image would be bright and would have a small black portion, and the effect of the local gradation conversion process can be probably expected. Therefore, the operation flow returns to Step SJ7 and the compositing ratio is calculated again according to the face condition or another condition, so that an image having more desirable brightness can be obtained.

Note that the processes corresponding to Steps SJ16 to SJ23 are performed for a dark image such as a night scene. For a night scene, the compositing ratio is set, for example, in the range from 0% (inclusive) to 20% (exclusive). Further, the processes corresponding to Steps SJ7 to SJ15 are performed for a bright image.

Note that the γ characteristic used for the uniform gradation conversion process and the compositing ratio used in the compositing process in the second image processing (see FIG. 15) are determined in the parameter selection process. In addition to those parameters, the size of an area to which the local gradation conversion process is applied may also be determined.

As described above, in the second gradation conversion process, the uniform gradation conversion process is performed, as a preparation process, according to a uniform y curve independently of the position in the image, and then the local gradation conversion process is performed such that the histogram of each of the local division areas in the image signal obtained through the still photography is smoothed. Therefore, even from a scene having a large difference in luminance, it is possible to generate an image having natural gradation in which extreme overexposure or underexposure does not occur.

As described above, according to the image capturing device of this embodiment, the target luminance used to determine the exposure condition is calculated by using the luminance information of a through-the-lens image and the luminance information of an image obtained through the pre-photographing process. In that case, since the target luminance is specified with underexposure and overexposure being predicted, when this target luminance is used to determine the exposure condition, an image having low underexposure or overexposure can be obtained. Further, when the luminance difference between the target luminance and the subject luminance exceeds a predetermined range (criteria)

range), the target luminance is corrected based on the luminance difference to obtain a more appropriate target luminance.

Further, while the target luminance is calculated, the effect of the local gradation conversion process, to be applied later, is taken into account. Therefore, the brightness of the background and that of the subject can be set to appropriate values to provide an image having the image quality desired by the photographer.

Further, according to this embodiment, the local gradation conversion process is applied to an image signal obtained through still photography, and the parameters therefor (the gradation curve used in the preparation for the local gradation conversion process and the compositing ratio) are determined based on information on the photographed scene (the luminance distribution, the subject luminance, the size of the subject, the F-value in photographing, and the subject magnification). Therefore, an appropriate gradation conversion process can be applied according to the features of the obtained image.

Further, while the target luminance is calculated, the effect of the local gradation conversion process, to be applied later, is taken into account. Therefore, the brightness of the background and that of the subject can be set to appropriate values to provide an image having the image quality desired by the photographer.

Second Embodiment

Next, a second embodiment of the present invention will be described with reference to FIG. 22.

According to the image capturing device 1 of the first embodiment, in the target luminance correction process (see FIG. 12A), performed in the photometric calculation process in Step SB8 of FIG. 3A, the lower threshold o_th_low and the upper threshold o_th_high, set in advance, are used to judge whether to correct the target luminance bv_p (see Step SF3 and corresponding steps of FIG. 12A). In an image capturing device of this embodiment, the lower threshold o_th_low and the upper threshold o_th_high are changed according to the gradation mode.

Hereinafter, the image capturing device of this embodiment will be described mainly in terms of the differences from those of the first embodiment, and a description of similarities will be omitted.

Figure 22:
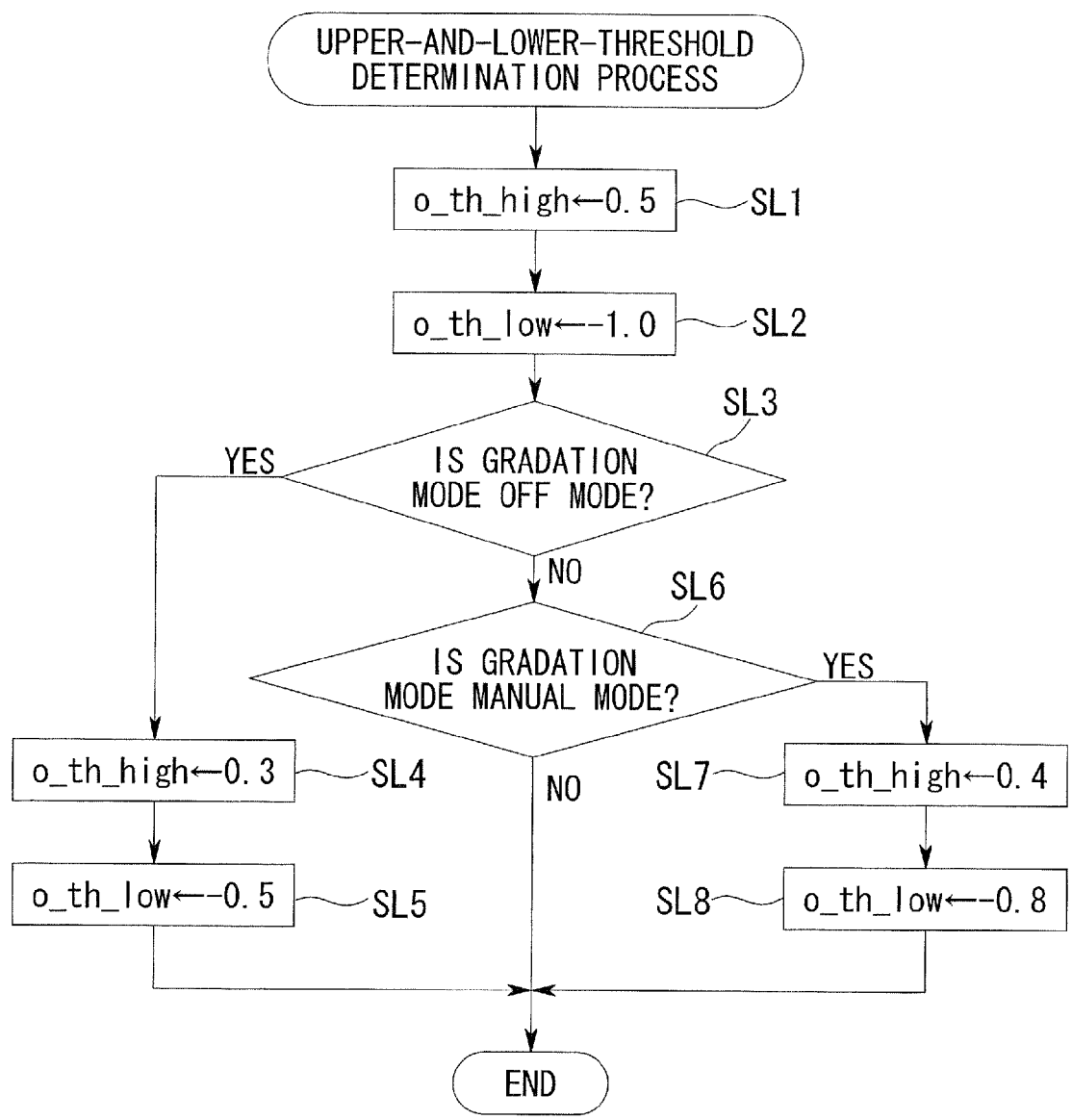
FIG. 22 is a diagram showing an upper-and-lower-threshold determination sequence according to a second embodiment of the present invention.

FIG. 22 is a diagram showing a sequence of an upper-and-lower-threshold determination process in which the lower threshold o_th_low and the upper threshold o_th_high, used in Step SF3 of the target luminance correction process shown in FIG. 12A, are determined according to the gradation mode.

First, the upper threshold o_th_high is set to an initial value of 0.5 (Step SL1) and the lower threshold o_th_low is set to an initial value of −1.0 (Step SL2). Then, it is judged whether the gradation mode is the off mode (Step SL3). When the gradation mode is the off mode, the upper threshold o_th_high is changed to 0.3 (Step SL4) and the lower threshold o_th_low is changed to −0.5 (Step SL5). Then, the upper-and-lower-threshold determination process ends. On the other hand, when the gradation mode is not the off mode, it is judged whether the gradation mode is the manual mode (Step SL6). When the gradation mode is the manual mode, the upper threshold o_th_high is changed to 0.4 (Step SL7) and the lower threshold o_th_low is changed to −0.8 (Step SL8). Then, the upper-and-lower-threshold determination process ends.

On the other hand, when it is judged in Step SL6 that the gradation mode is not the manual mode, the upper-and-lower-threshold determination process ends with the upper threshold o_th_high and the lower threshold o_th_low being left to the initial values.

After the upper threshold o_th_high and the lower threshold o_th_low are determined according to the gradation mode, those values are used to perform the above-described target luminance correction process (see FIG. 12A and FIG. 12B).

As described above, according to the present invention, the upper threshold o_th_high and the lower threshold o_th_low are changed according to the gradation mode, so that a more preferable target luminance can be determined with the gradation conversion process performed in the second image processing being taken into account.

Note that when the gradation mode is the manual mode, the upper threshold o_th_high and the lower threshold o_th_low may be changed based on information set by the user (such as the compositing ratio and the size of an area to which the local gradation conversion process is applied, used in the second image processing). In that case, when the compositing ratio or the size of an area to which the local gradation conversion process is applied becomes larger, it is preferable that the absolute value of the upper threshold o_th_high and the absolute value of the lower threshold o_th_low be changed to be larger than their initial values. With this operation, a desirable image can be obtained also with the user settings.

Further, the correction factors k_high and k_low may be changed according to the gradation mode. With this operation, even when the gradation mode is the off mode, a moderately good image can be obtained by emphasizing the main subject.

Third Embodiment

Next, a third embodiment of the present invention will be described with reference to FIG. 23.

As in the second embodiment, an image capturing device of this embodiment sets the upper threshold o_th_high and the lower threshold o_th_low in a manner different from that in the first embodiment. Specifically, the upper threshold o_th_high and the lower threshold o_th_low are changed according to any of three cases: when a face was detected in the through-the-lens image; when a face was not detected but distance measurement was able to be performed; and when neither a face was detected nor distance measurement was able to be performed.

Figure 23:
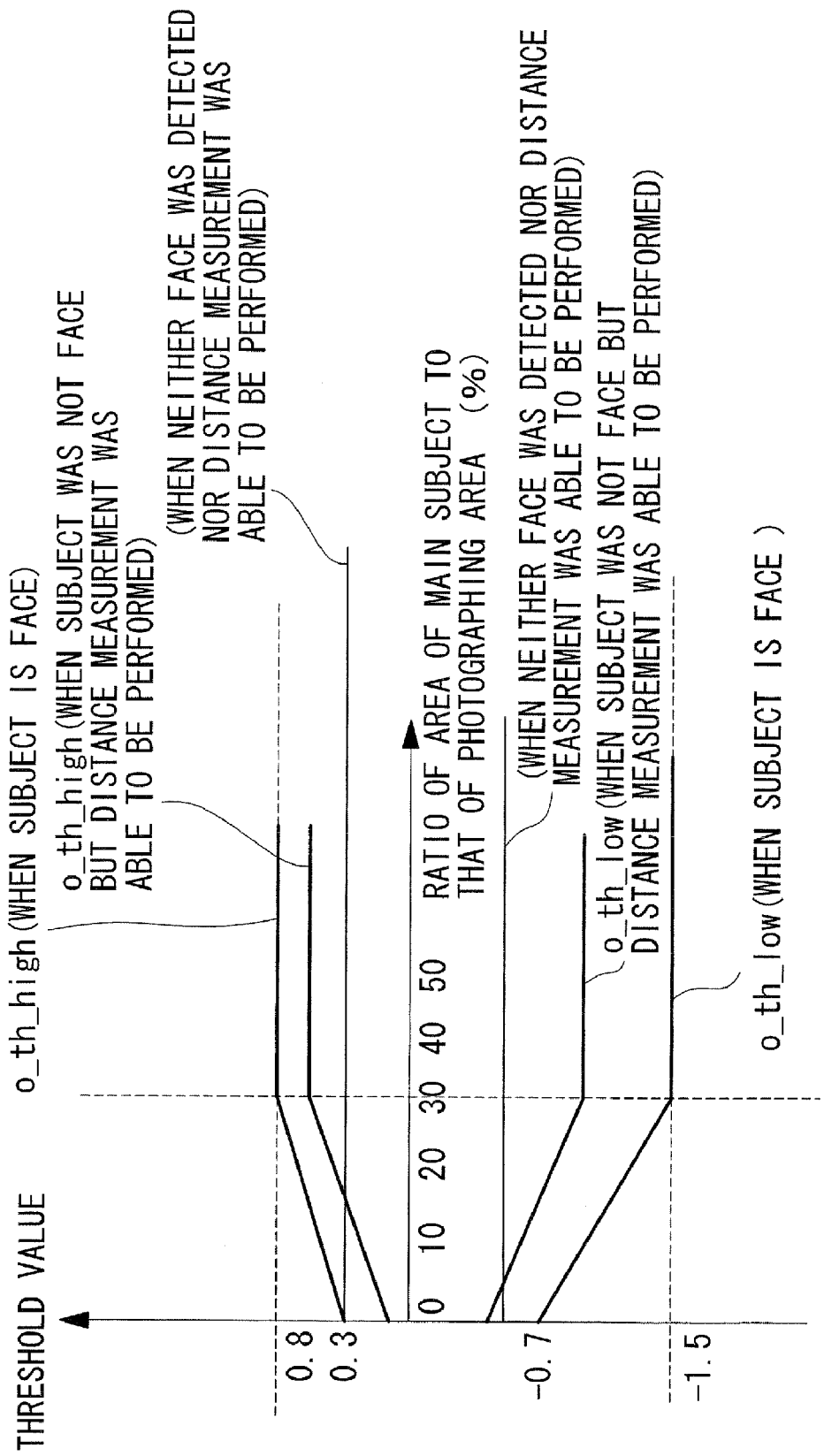
FIG. 23 is a graph showing an example method of setting an upper threshold and a lower threshold, according to a third embodiment of the present invention.

FIG. 23 is a graph showing an example method of setting the upper threshold o_th_high and the lower threshold o_th_low according to this embodiment. In FIG. 23, the vertical axis indicates thresholds and the horizontal axis indicates the area ratio of the subject area to the photographing area. As shown in FIG. 23, when a face was detected, and when a face was not detected but distance measurement was able to be performed, the absolute values of the lower threshold o_th_low and the upper threshold o_th_high are set larger as the area ratio of the subject area to the photographing area becomes larger. Note that, in either case, in an area whose area ratio is a predetermined value (for example, 30%) or more, the upper threshold o_th_high and the lower threshold o_th_low are set to fixed values.

In this embodiment, when a face was detected and the area ratio is 0%, the lower threshold o_th_low is set to −0.7 and the upper threshold o_th_high is set to 0.3. When a face was detected and the area ratio is 30%, the lower threshold o_th_low is set to −1.5 and the upper threshold o_th_high is set to 0.8. Further, in an area whose area ratio ranges from 0% to 30%, those thresholds are changed linearly.

When a face was not detected but distance measurement was able to be performed, the absolute values of the lower threshold o_th_low and the upper threshold o_th_high are set smaller than when a face was detected. In this embodiment, when the area ratio is 0%, the lower threshold o_th_low is set to −0.4 and the upper threshold o_th_high is set to 0.1. When the area ratio is 30%, the lower threshold o_th_low is set to −0.9 and the upper threshold o_th_high is set to 0.7. In an area whose area ratio ranges from 0% to 30%, those thresholds are changed linearly.

When neither a face was detected nor distance measurement was able to be performed, the lower threshold o_th_low is always set to −0.5 and the upper threshold o_th_high is always set to 0.3 irrespectively of the ratio of the area of the subject area to that of the photographing area.

Note that the area ratio of the subject area to the photographing area and the result of the judgment as to whether a face was detected can be obtained in the corresponding steps in the luminance distribution calculation process shown in FIG. 4A and FIG. 4B.

As described above, according to this embodiment, since the lower threshold and the upper threshold are set according to the results of judgment as to whether a face was detected and whether distance measurement was able to be performed, even when a face was not detected, more desirable target luminance can be determined with the gradation conversion process performed in the second image processing being taken into account.

Fourth Embodiment

Next, a fourth embodiment of the present invention will be described with reference to FIGS. 24 and 25.

According to the image capturing device 1 of the first embodiment, in the target luminance calculation process (see FIG. 9A and FIG. 9B) performed in the photometric calculation process in Step SB8 of FIG. 3A, the lower threshold d_th_low and the upper threshold d_th_high, set in advance, are used to count the number of noise luminance pixels and the number of highlight luminance pixels, respectively, and then the target luminance bv_p is calculated (see Step SE3 and corresponding steps of FIG. 9A). In an image capturing device of this embodiment, the lower threshold d_th_low and the upper threshold d_th_high are changed according to the ISO sensitivity. Hereinafter, the image capturing device of this embodiment will be described mainly in terms of the differences from those of the first embodiment, and a description of similarities will be omitted.

Figures 24, 25:
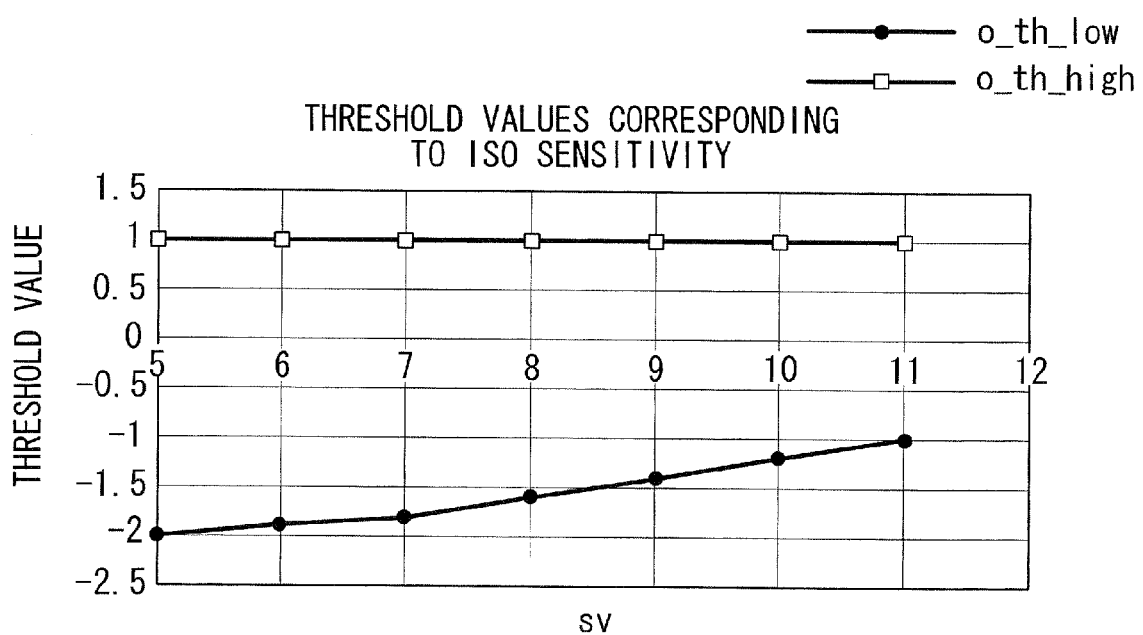
FIG. 24 is a table including numeric values of an upper threshold and a lower threshold corresponding to ISO sensitivity levels, showing an example method of setting the upper threshold and the lower threshold according to a fourth embodiment of the present invention.
FIG. 25 is a graph drawn from the table of FIG. 24.

FIG. 24 is a table including numeric values of the lower threshold d_th_low and the upper threshold d_th_high corresponding to ISO sensitivity levels. FIG. 25 is a graph drawn from the table shown in FIG. 24. As shown in FIGS. 24 and 25, the lower threshold d_th_low is set to a larger value as the ISO sensitivity becomes larger and the upper threshold d_th_high is fixed at 1.0 irrespectively of the ISO sensitivity.

As described above, according to this embodiment, since the upper and lower thresholds used in the target luminance calculation process are set according to the ISO sensitivity, a more desirable target luminance can be determined even at high sensitivity, where the effect of the second image processing is not high.

Fifth Embodiment

Next, a fifth embodiment of the present invention will be described with reference to FIGS. 26 to 30.

In the first embodiment, the luminance signal of a through-the-lens image is used to perform the luminance distribution calculation process, the photometric calculation process, and the exposure calculation process, shown in FIG. 3A and FIG. 3B, and, based on the results obtained in those processes, the exposure condition for still photography and the parameters for the second image processing performed by the second image processing unit 27 (see FIG. 1) are determined. In this case, the local gradation conversion process may or may not be applied at the time of capturing a through-the-lens image.

In this embodiment, the local gradation conversion process is applied to the through-the-lens image signal and the through-the-lens image signal obtained after the local gradation conversion process is used to determine the exposure condition and the parameters for the second image processing.

Hereinafter, an image capturing device of this embodiment will be described in terms of the differences from those of the first embodiment, and a description of similarities will be omitted.

First, before the face detection is performed in Step SB1 of the still photography sequence shown in FIG. 3A, the first image processing, the second image processing (the uniform gradation conversion process and the local gradation conversion process), and the third image processing are applied to the image signal obtained at the time of the through-the-lens image photographing in the image capturing unit 2, to obtain a final through-the-lens image. The final through-the-lens image and the exposure condition (for example, AE) for the through-the-lens image photographing are stored in a recording medium. This final through-the-lens image is used for various processes such as the face detection process.

Figure 26A:
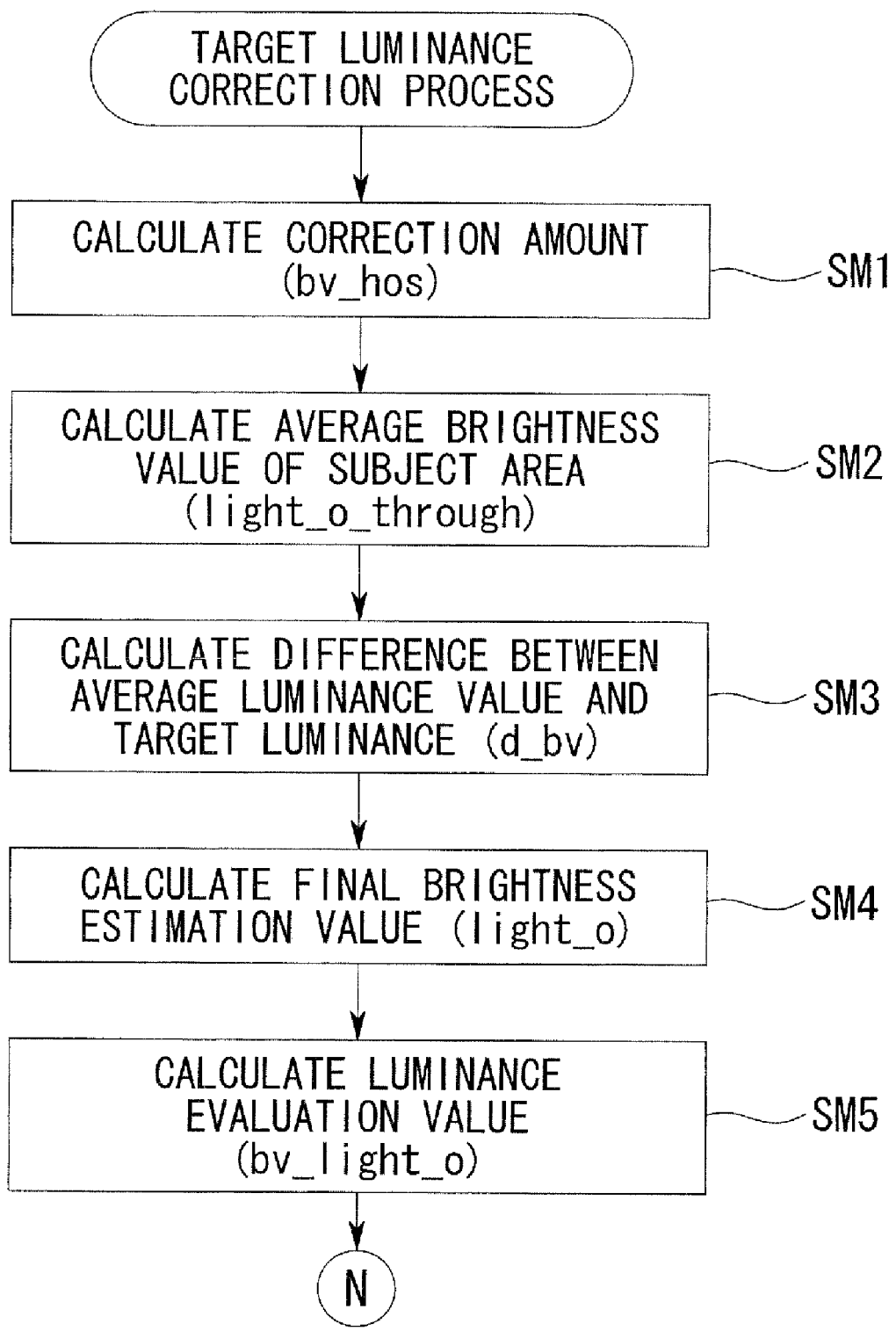
FIG. 26A is a diagram showing a sequence of a target luminance correction process according to a fifth embodiment of the present invention.
Figure 26B:
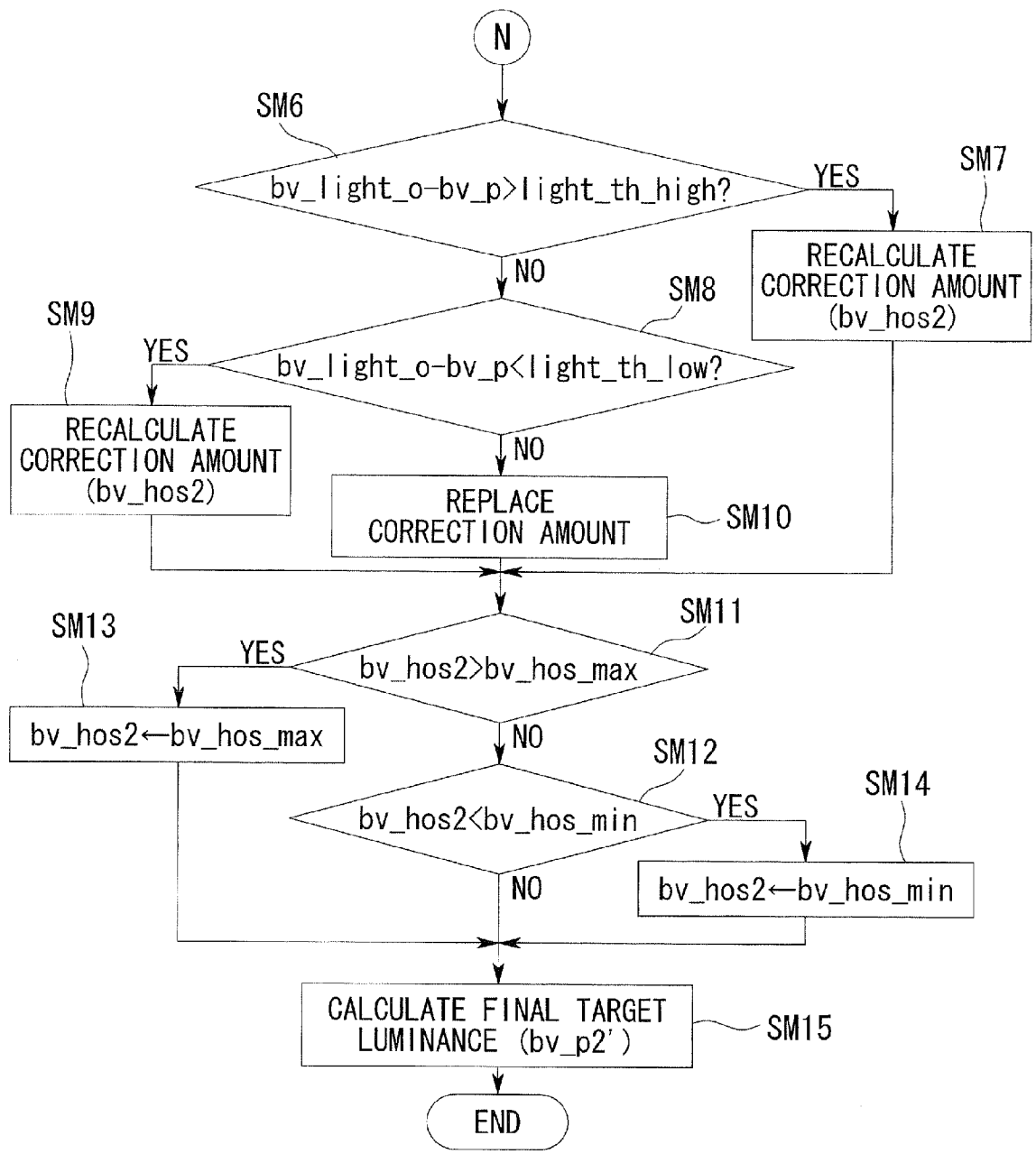
FIG. 26B is a diagram showing a sequence of a target luminance correction process according to a fifth embodiment of the present invention.

For example, in this embodiment, the target luminance correction process (see FIG. 12A and FIG. 12B) performed in the photometric calculation process (Step SB8 of FIG. 3A) may be changed to a sequence of a target luminance correction process shown in FIG. 26A and FIG. 26B. Note that, in the target luminance correction process shown in FIG. 26A and FIG. 26B, identical reference symbols are given to steps identical to those in the target luminance correction process (FIG. 12A and FIG. 12B) of the first embodiment, and a description thereof will be omitted.

First, the correction amount bv_hos for the target luminance is determined through Steps SF1 to SF8 of FIG. 12A and FIG. 12B, as in the first embodiment (Step SM1 of FIG. 26A). The final through-the-lens image signal to which the local gradation conversion process and the like have been applied is used to calculate the average brightness value light_o_through of the subject area (Step SM2). The photographing area is divided into multiple division areas in a grid-like manner, and the average value, in division areas corresponding to the subject area, of a brightness signal Y obtained when the image processing such as gradation conversion is applied to the through-the-lens image obtained immediately before the still photography is calculated and set as the average brightness value light_o_through. Next, the difference d_bv between the APEX values corresponding to the exposure condition for the through-the-lens image photographing and the target luminance bv_p is calculated (Step SM3).

$$d\_bv = (av\_s) + (tv\_s) - (sv\_s) - bv\_p \qquad (17\text{-}1)$$

In expression (17-1), (av_s), (tv_s), and (sv_s) are the APEX values corresponding to the aperture, the shutter speed, and the ISO sensitivity, respectively. The difference d_bv obtained in Step SM3 is reflected in the average brightness value light_o_through of the subject area obtained in Step SM2 to obtain a final brightness estimation value light_o (Step SM4). The final brightness estimation value light_o is given by the following expression (17-2), for example.

$$light\_o = light\_o\_through + g(d\_bv) \qquad (17\text{-}2)$$

As a result, a quantitative brightness estimation value of the subject area can be obtained independently of the difference in exposure condition.

The brightness estimation value light_o obtained in Step SM4 is converted into luminance by using the following expression (18) to obtain a luminance evaluation value bv_light_o (Step SM5).

$$bv\_light\_o = h(light\_o) \qquad (18)$$

Then, it is judged whether the difference between the luminance evaluation value bv_light_o and the target luminance bv_p is larger than a second upper threshold light_th_high (Step SM6). When the difference therebetween is larger than the second upper threshold light_th_high, a correction amount bv_hos2 is calculated by the following expression (19) (Step SM7).

$$bv\_hos2 = bv\_hos + bv\_light\_o - bv\_p - o\_th\_high \qquad (19)$$

On the other hand, when the difference therebetween is equal to or smaller than the second upper threshold light_th_high, it is judged whether the difference between the luminance evaluation value bv_light_o and the target luminance bv_p is smaller than a second lower threshold light_th_low (Step SM8). When the difference therebetween is smaller than the second lower threshold light_th_low, the correction amount bv_hos2 is calculated by the following expression (20) (Step SM9).

$$bv\_hos2 = bv\_hos + bv\_light\_o - bv\_p - o\_th\_low \qquad (20)$$

Note that the second upper threshold light_th_high and the second lower threshold light_th_low are recorded in the flash memory 42 or the like (see FIG. 1) in advance, and are read therefrom and set.

On the other hand, when the difference between the luminance evaluation value bv_light_o and the target luminance bv_p is equal to or larger than the second lower threshold light_th_low and is equal to or smaller than the second upper threshold light_th_high, the correction amount bv_hos is replaced with the correction amount bv_hos2 (Step SM10).

Next, it is judged whether the correction amount bv_hos2 falls in the range from the correction lower value bv_hos_min and the correction upper value bv_hos_max (Steps SM11 and SM12). When the correction amount bv_hos2 is larger than the correction upper value bv_hos_max, the correction amount bv_hos2 is set to the correction upper value bv_hos max (Step SM13). When the correction amount bv_hos2 is smaller than the correction lower value bv_hos_min, the correction amount bv_hos2 is set to the correction lower value bv_hos_min (Step SM14).

In Step SM15, the correction amount bv_hos2 obtained through the above-described sequence is used to correct the target luminance bv_p to obtain a final target luminance bv_p2'. Then, the target luminance correction process ends. The final target luminance bv_p2' is calculated by the following expression (20).

$$bv\_p2' = bv\_p + bv\_hos2 \qquad (20)$$

Figure 17B:
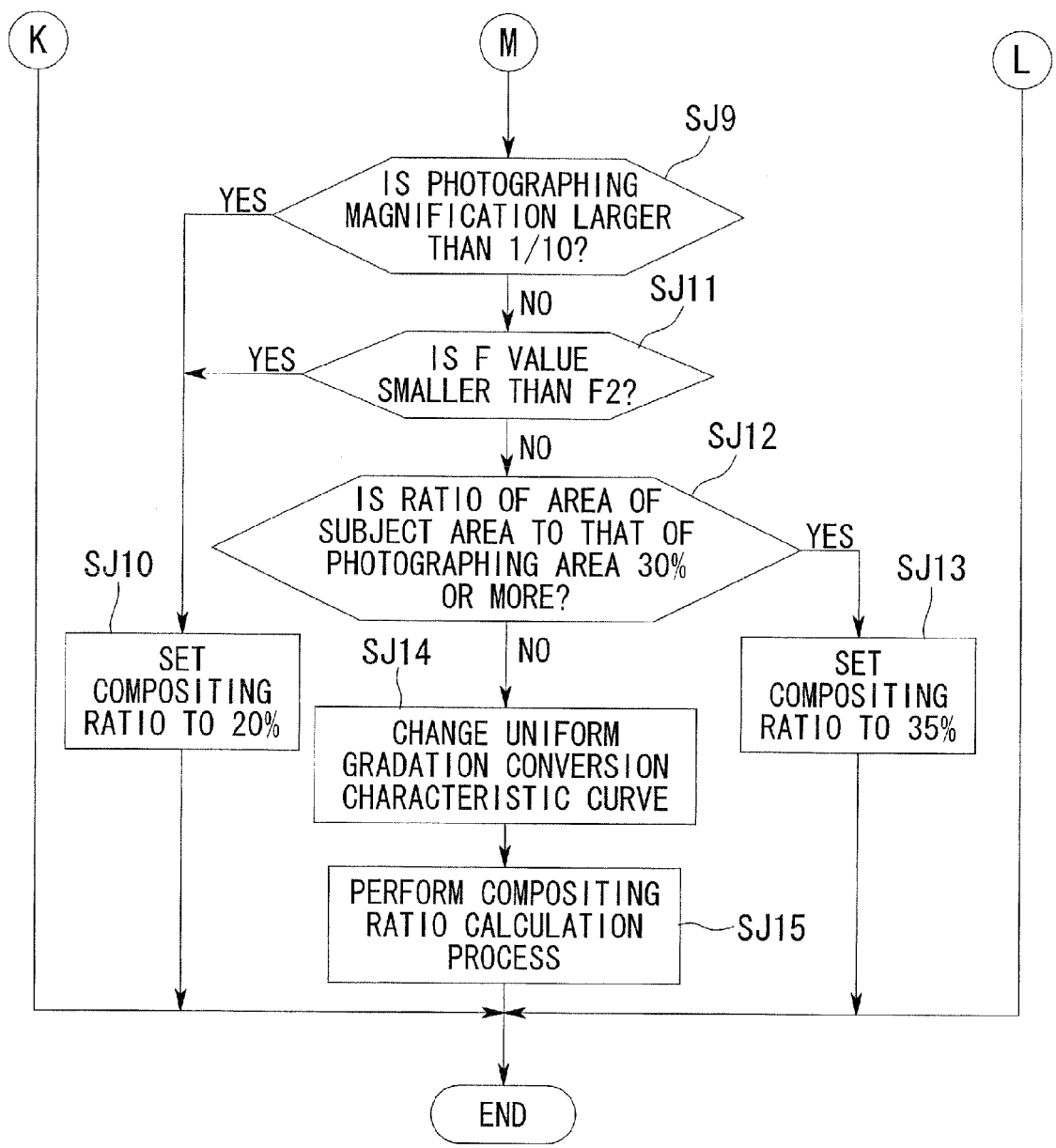
FIG. 17B is a diagram showing a sequence of a parameter selection process.
Figure 27:
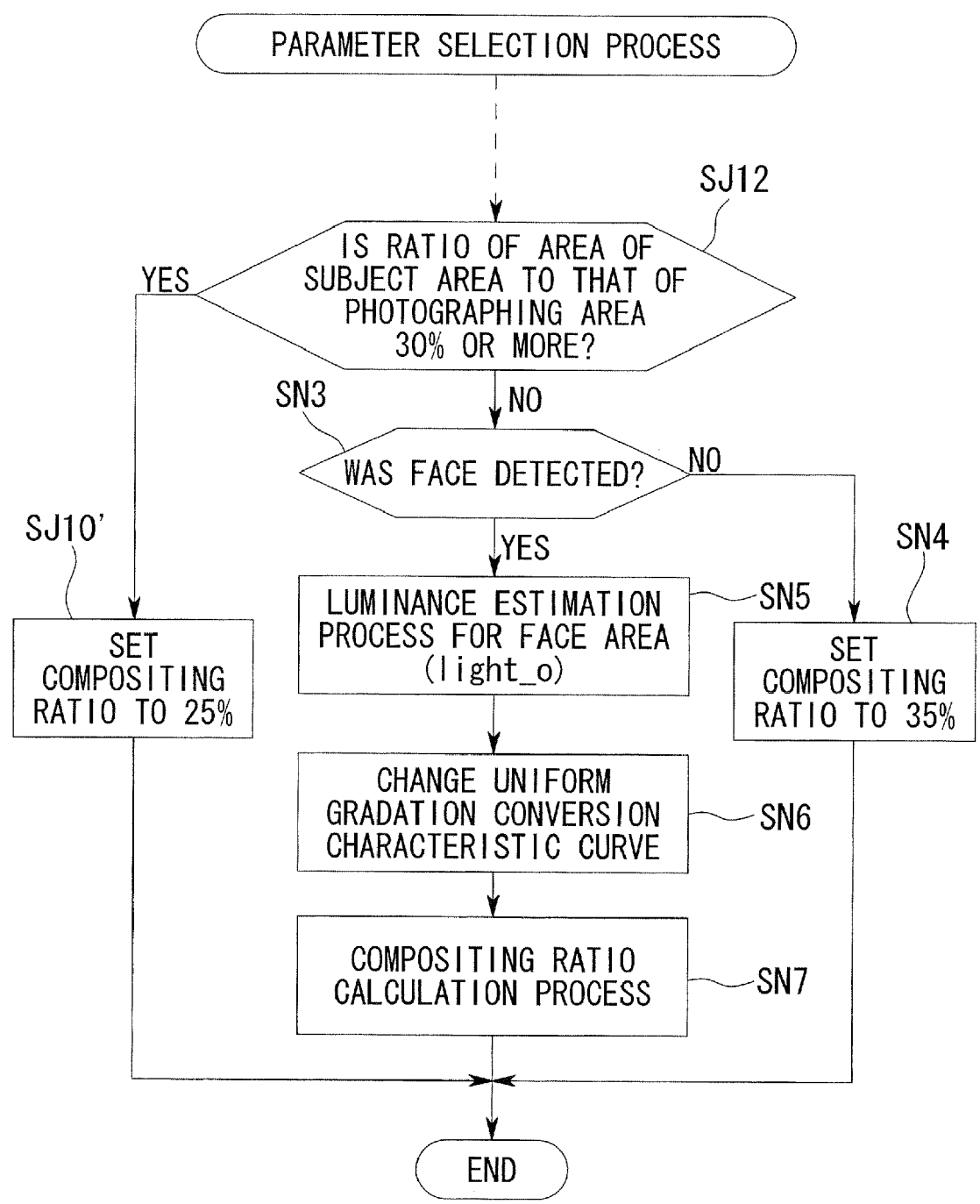
FIG. 27 is a diagram showing a sequence of a parameter selection process according to the fifth embodiment of the present invention.

Further, in this embodiment, the parameter selection process performed in the second image processing may be changed to a sequence of a parameter selection process shown in FIG. 27. Note that, in the parameter selection process shown in FIG. 27, identical reference symbols are given to steps identical to those in the parameter selection process (see FIG. 17A and FIG. 17B) of the first embodiment, and a description thereof will be omitted.

When it is judged in Step SJ12 that the area ratio of the subject area to the photographing area is 30% or more, the compositing ratio is set to 25% in Step SJ10'. Then, the parameter selection process ends. On the other hand, when it is judged in Step SJ12 that the area ratio of the subject area to the photographing area is 30% or less, it is judged whether a face was detected (Step SN3). When a face was riot detected, the compositing ratio is set to 35% (Step SN4). Then, the parameter selection process ends. When a face was detected, a luminance estimation process for the face area (subject area) in the final through-the-lens image is performed (Step SN5).

Figures 28, 29:
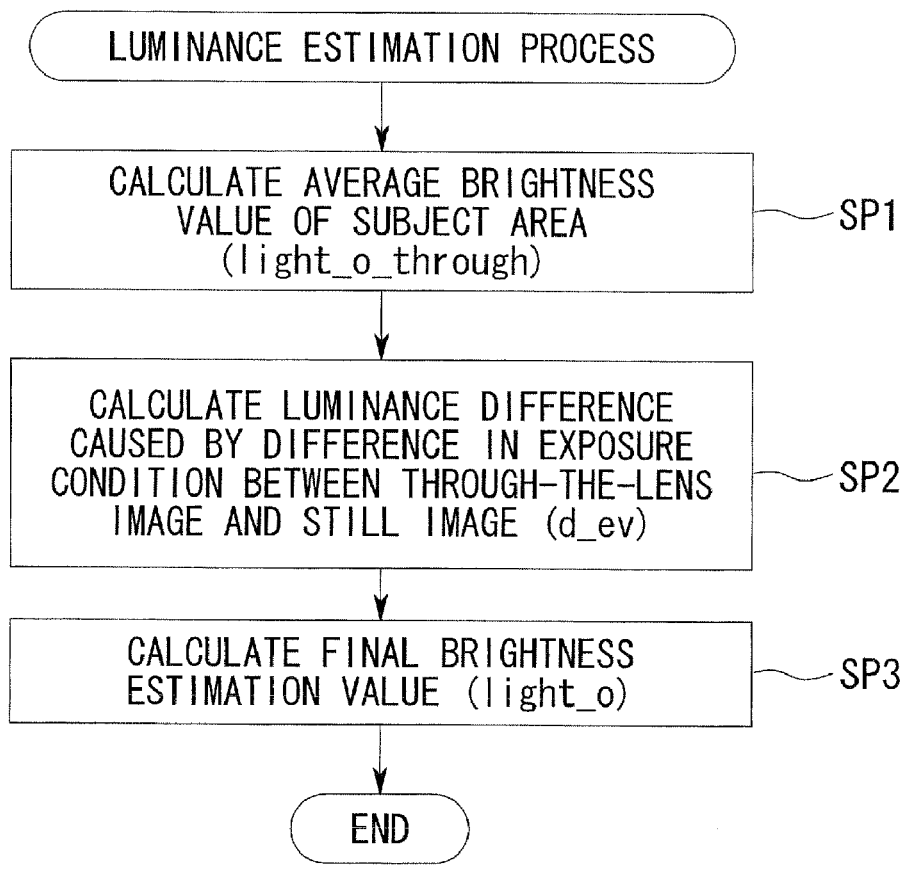
FIG. 28 is a diagram showing a sequence of a luminance estimation process performed in the parameter selection process shown in FIG. 27.
FIG. 29 is a table showing the relationship between gradation conversion characteristic curves and a subject-area average luminance value used in the luminance estimation process.

In the luminance estimation process, as shown in FIG. 28, the photographing area is divided into multiple division areas in a grid-like manner and the average value, in division areas corresponding to the subject area, of a brightness signal Y obtained when the image processing such as gradation conversion is applied to the through-the-lens image obtained immediately before the still photography is calculated and set as the average brightness value light_o_through (Step SP1). The luminance difference d_ev caused by the difference between the exposure condition for the through-the-lens image photographing and the exposure condition for the still photography is calculated by using the following expression (21-1) (Step SP2). Note that since the parameter selection process is performed after the still photography, the exposure condition for the still photography is determined.

$$d\_ev = (av\_s) + (tv\_s) - (sv\_s) - (av\_still) + (tv\_still) - (sv\_still) \qquad (21\text{-}1)$$

In expression (21-1), (av_s), (tv_s), and (sv_s) are the APEX values corresponding to the aperture, the shutter speed, and the sensitivity, respectively, for the through-the-lens image photographing. Further, (av_still), (tv_still), and (sv_still) are the APEX values corresponding to the aperture, the shutter speed, and the sensitivity, respectively, for the still photography.

Next, the luminance difference d_ev obtained in Step SP2 is reflected in the average brightness value light_o_through of the subject area obtained in Step SP1 to obtain a final brightness estimation value light_o (Step SP3). The final brightness estimation value light_o is given by the following expression (21-2), for example.

$$light\_o = light\_o\_through + f(d\_ev) \qquad (21\text{-}2)$$

After the brightness estimation value light_o of the subject area is obtained in the brightness estimation process, the operation flow advances to Step SN6 of FIG. 27. In Step SN6, the γ characteristic used for the uniform gradation conversion process, selected in Step SJ1 (see FIG. 17A), is changed.

Specifically, as shown in FIG. 29, when the brightness estimation value light_o of the subject area is equal to or larger than a predetermined value th2', γ2 is selected. When the brightness estimation value light_o of the subject area is equal to or larger than a predetermined value th1' and is smaller than the predetermined value th2', γ3 is selected. When the brightness estimation value light_o of the subject area is smaller than the predetermined value th1', γ4 is selected. The γ characteristics are shown in FIG. 19.

Then, in Step SN7, the compositing ratio is determined. Specifically, as shown in FIG. 30, when the brightness estimation value light_o of the subject area is equal to or larger than the predetermined value th2', the compositing ratio is set to 30%. When the brightness estimation value light_o of the subject area is equal to or larger than the predetermined value th1' and is smaller than the predetermined value th2', the compositing ratio is set to 45%. When the brightness estimation value light_o of the subject area is smaller than the predetermined value th1', the compositing ratio is set to 50%.

As described above, according to the image capturing device of this embodiment, since the through-the-lens image which has been subjected to various types of processing, in particular, to the local gradation conversion process, is used to determine the exposure condition or the parameters used in the second image processing (see FIG. 15), more reliable parameters can be determined. In particular, it is difficult to estimate a result obtained through the local gradation conversion process. When the face area (subject area) is small, the local gradation conversion process produces a large influence. In that case, the through-the-lens image which has been subjected to the local gradation conversion process is used to determine the parameters used in the second image processing applied to the image signal obtained through still photography or to correct the exposure condition, so that an image obtained after the second image processing is easily estimated, more reliable parameters can be determined, and a still image having more desirable image quality can be obtained.

Although the embodiments of the present invention have been described in detail with reference to the drawings, specific configurations are not limited to those embodiments but include design variations made without departing from the scope of the present invention.

For example, photometry is performed through calculation in the photometric calculation process in the embodiments. Instead, a sensor or the like may be provided and used to perform the photometry.

What is claimed is:

1. An image capturing device comprising:
    a subject detecting unit which detects a main subject in an image obtained before actual photographing, from an image signal of the image;
    a subject luminance information acquiring unit which obtains luminance information on the main subject from the image signal;
    a luminance distribution calculating unit which calculates a luminance distribution of each of multiple areas in the image;
    a target luminance calculating unit which determines a target luminance, related to exposure, based on the luminance distribution;
    a target luminance correcting unit which corrects the target luminance when a difference between the target luminance and the luminance of the main subject does not fall in a criterial range; and
    an exposure condition determining unit which determines an exposure condition for the actual photographing based on the target luminance or a corrected target luminance when the target luminance correcting unit has corrected the target luminance,
    wherein the target luminance correcting unit comprises:
        a criterial range determining unit which determines the criterial range; and
        a correction amount determining unit which determines a correction amount by using the difference between the target luminance and the luminance of the main subject,
    wherein the image capturing device has a first setting mode in which a local gradation conversion process is applied to a pixel of interest of the image based on the image signal of a local area around the pixel of interest, and a second setting mode in which the local gradation conversion process is not applied, and
    wherein the criterial range determining unit determines the criterial range according to a setting mode that is used.

2. An image capturing device according to claim 1, wherein an absolute value of a lower threshold of the criterial range is larger than an absolute value of an upper threshold of the criterial range.

3. An image capturing device according to claim 1, wherein the criterial range determining unit determines the criterial range according to a sensitivity setting of an image pickup device.

4. An image capturing device according to claim 1, wherein:
    the subject detecting unit comprises an area ratio calculating unit which calculates an area ratio of the main subject; and
    the criterial range determining unit determines the criterial range according to the area ratio.

5. An image capturing device according to claim 1, wherein:
    the subject detecting unit comprises a face detecting Unit which detects a face; and
    the criterial range determining unit determines the criterial range according to a detection result of the face detecting unit.

6. An image capturing device according to claim 1, wherein:
    the subject detecting unit comprises a face detecting unit which detects a face; and
    the correction amount determining unit determines the correction amount according to a detection result of the face detecting unit.

7. An image capturing device according to claim 1, further comprising an image processing unit which performs at least one of a first gradation conversion process in which a uniform gradation conversion process is applied to each pixel in the image according to a uniform gradation conversion characteristic curve, and a second gradation conversion process in which the local gradation conversion process is applied to the image.

8. An image capturing device according to claim 1, wherein the criterial range determining unit sets the criterial range wider when the local gradation conversion process is applied than when the local gradation conversion process is not applied.

9. An image capturing device according to claim 7, wherein the image processing unit comprises:
    a combining unit which combines a first image serving as a result obtained through the uniform gradation conversion process and a second image serving as a result obtained through the local gradation conversion process, at a predetermined compositing ratio; and
    a parameter selecting unit which sets at least one of a gradation conversion characteristic curve used for the uniform gradation conversion process and the predetermined compositing ratio such that the luminance of the subject falls in a predetermined luminance range.

10. An image capturing device according to claim 1, wherein the image signal is obtained after the local gradation conversion process is applied to an output signal of an image pickup device.

11. An image capturing device according to claim 10, wherein the target luminance correcting unit corrects the target luminance according to the difference between the luminance of a subject area in the image and the target luminance.

12. An image capturing device comprising:

a luminance distribution calculating unit which calculates a luminance distribution of multiple areas in an image obtained before actual photographing, from parts corresponding to the multiple areas, of an image signal of the image;

a target luminance calculating unit which determines a target luminance, related to exposure, based on the luminance distribution;

a subject detecting unit which detects a main subject in the image from the image signal;

a subject luminance information acquiring unit which obtains luminance information on the main subject from the image signal;

an image processing unit which applies a local gradation conversion process to a pixel of interest of the image based on the image signal of a local area around the pixel of interest;

a luminance evaluation value calculating unit which calculates a luminance evaluation value of the main subject by using an image signal obtained through the local gradation conversion process;

a target luminance correcting unit which corrects, when the difference between the luminance evaluation value and the target luminance does not fall in a predetermined range, the target luminance such that the difference falls in the predetermined range; and an exposure condition determining unit which determines an exposure condition for actual photographing based on the corrected target luminance, wherein the image capturing device has a first setting mode in which the local gradation conversion process is applied, and a second setting mode in which the local gradation conversion process is not applied, and wherein the predetermined range is determined according to a setting mode that is used.

* * * * *